US 8,860,921 B2

(12) United States Patent
Takama et al.

(10) Patent No.: US 8,860,921 B2
(45) Date of Patent: Oct. 14, 2014

(54) LIQUID CRYSTAL OPTICAL DEVICE

(75) Inventors: Daisuke Takama, Kanagawa (JP);
Takeo Koito, Kanagawa (JP); Tsuyoshi Ohyama, Tokyo (JP)

(73) Assignee: Japan Display West Inc., Aichi (JP)

( * ) Notice: Subject to any disclaimer, the term of this patent is extended or adjusted under 35 U.S.C. 154(b) by 125 days.

(21) Appl. No.: 13/591,458

(22) Filed: Aug. 22, 2012

(65) Prior Publication Data

US 2013/0063691 A1    Mar. 14, 2013

(30) Foreign Application Priority Data

Aug. 30, 2011    (JP) .................. 2011-186983

(51) Int. Cl.
| G02F 1/13 | (2006.01) |
| G02F 1/1339 | (2006.01) |
| G02F 1/29 | (2006.01) |
| G02F 1/1333 | (2006.01) |
| G02B 27/22 | (2006.01) |
| G02F 1/1343 | (2006.01) |

(52) U.S. Cl.
CPC .............. *G02F 1/29* (2013.01); *G02F 1/13394* (2013.01); *G02F 1/133377* (2013.01); *G02B 27/2214* (2013.01); *G02F 1/134309* (2013.01); *G02F 2201/128* (2013.01)
USPC ........................... 349/200; 349/139; 349/156

(58) Field of Classification Search
CPC .......... G02F 1/133526; G02F 1/13306; G02F 1/13363; G02F 1/133377; G02F 1/1335; G02F 1/133611; G02F 1/13394; G02F 1/134309; G02F 1/1347; G02F 1/139; G02F 1/1396; G02F 1/29; G02F 2001/134345; G02F 2001/134372; G02F 2001/133562; G02F 1/294; G02F 2201/123; G02F 2201/128; G09G 2320/028; G09G 2320/0233; G09G 2300/043; G09G 2300/0447; G09G 2300/0426; G02B 6/0053; G02B 6/003; G02B 13/0095; G02B 2027/0134; G02B 27/2242; G02B 3/0037; G02B 3/14; G02B 5/045; H04N 13/0409

USPC ..................... 348/E13.027, E13.029, E13.03, 348/E13.044; 359/619, 290, 462; 349/5, 62, 349/95, 139, 143, 200, 201, 156, 155; 345/87, 205

See application file for complete search history.

(56) References Cited

U.S. PATENT DOCUMENTS 6,504,592 B1    1/2003  Takatori et al.
2001/0055145 A1  12/2001  Hamada (Continued)

FOREIGN PATENT DOCUMENTS

JP    2001-133918       5/2001
JP    2010-282090 A    12/2010

OTHER PUBLICATIONS

European Search Report for EP Application No. 12-18-0267 dated Nov. 27, 2012.
European Communication issued in connection with EP counterpart application EP Application No. 12 180 267.2 mailed on Feb. 27, 2014.

*Primary Examiner* — Thoi Duong
(74) *Attorney, Agent, or Firm* — Dentons US LLP

(57) ABSTRACT

A liquid crystal optical device includes: a first substrate having transparent plural strip electrodes formed to make groups in respective given areas; a second substrate having a transparent common electrode; and a liquid crystal layer arranged between the first substrate and the second substrate, in which a retardation distribution is controlled in respective given areas according to voltages to be applied between the common electrode and the strip electrodes, wherein wall spacers are provided at portions corresponding to boundaries of given areas between the first substrate and the second substrate, and a shield electrode to which a fixed value voltage is applied is provided on at least one of two wall surfaces of each spacer.

9 Claims, 20 Drawing Sheets

(56) References Cited

U.S. PATENT DOCUMENTS

| | | |
|---|---|---|
| 2005/0264471 A1 | 12/2005 | Yamazaki et al. |
| 2011/0157499 A1 | 6/2011 | Lee et al. |
| 2011/0199548 A1* | 8/2011 | Takama .......................... 349/15 |

\* cited by examiner

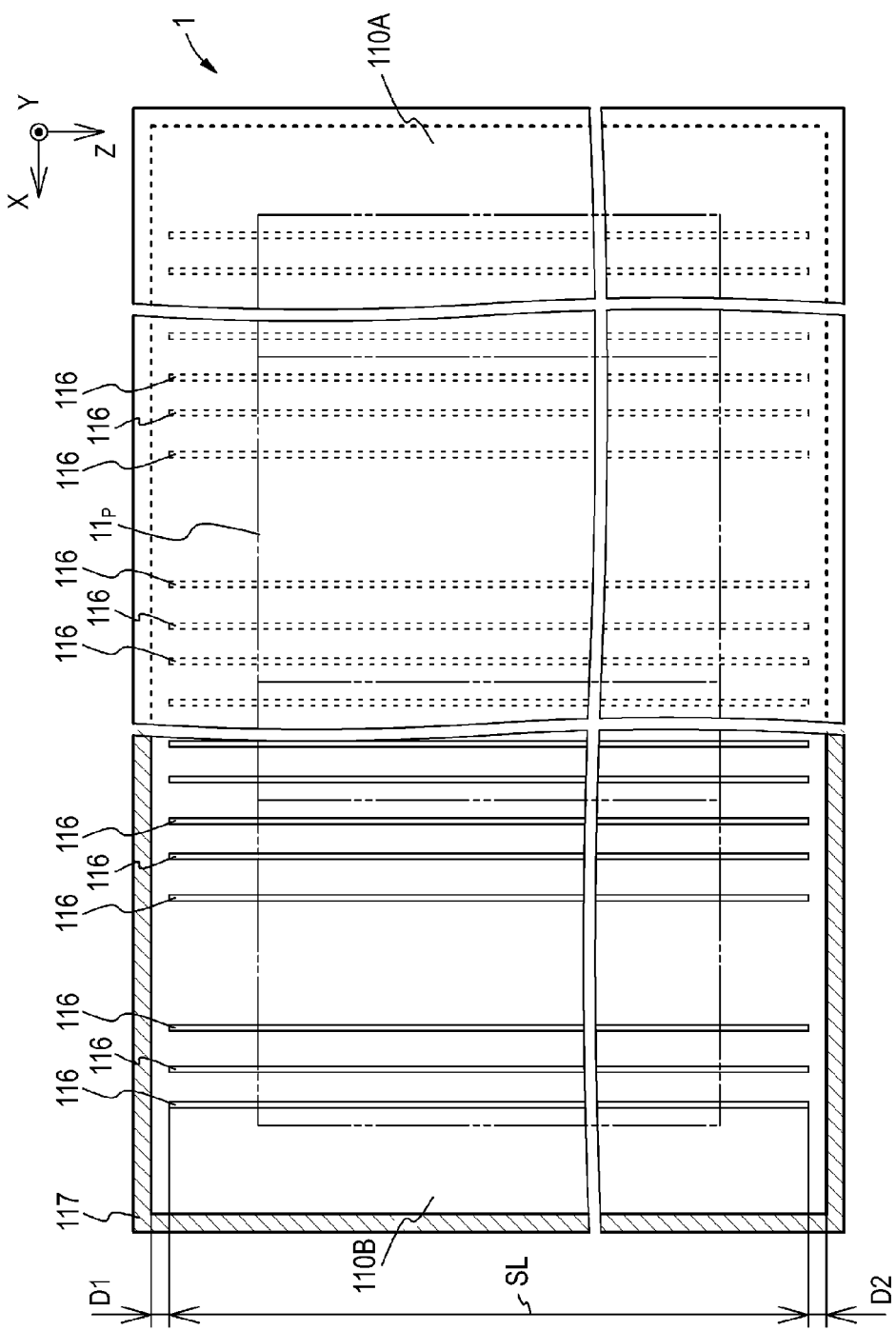

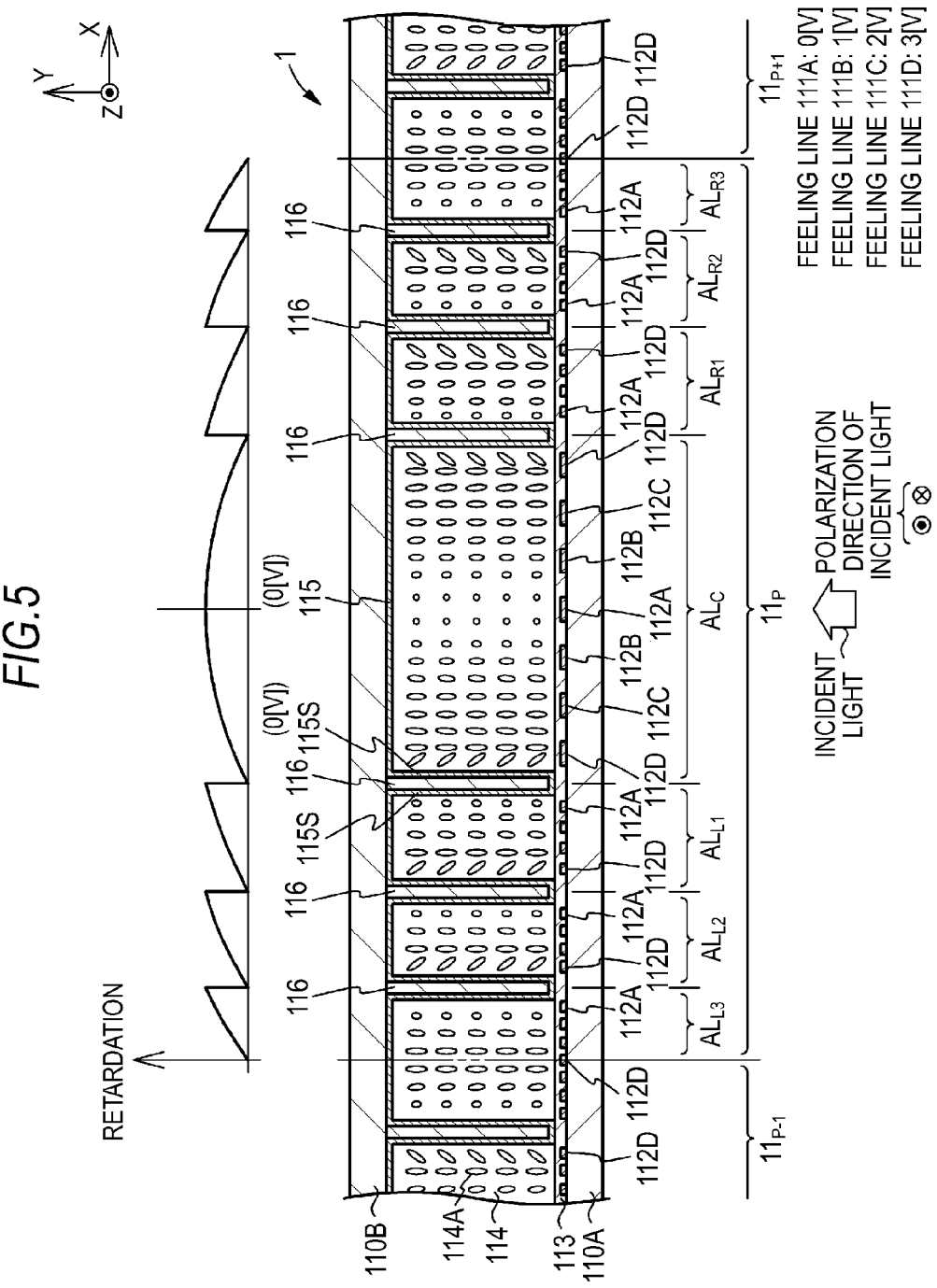

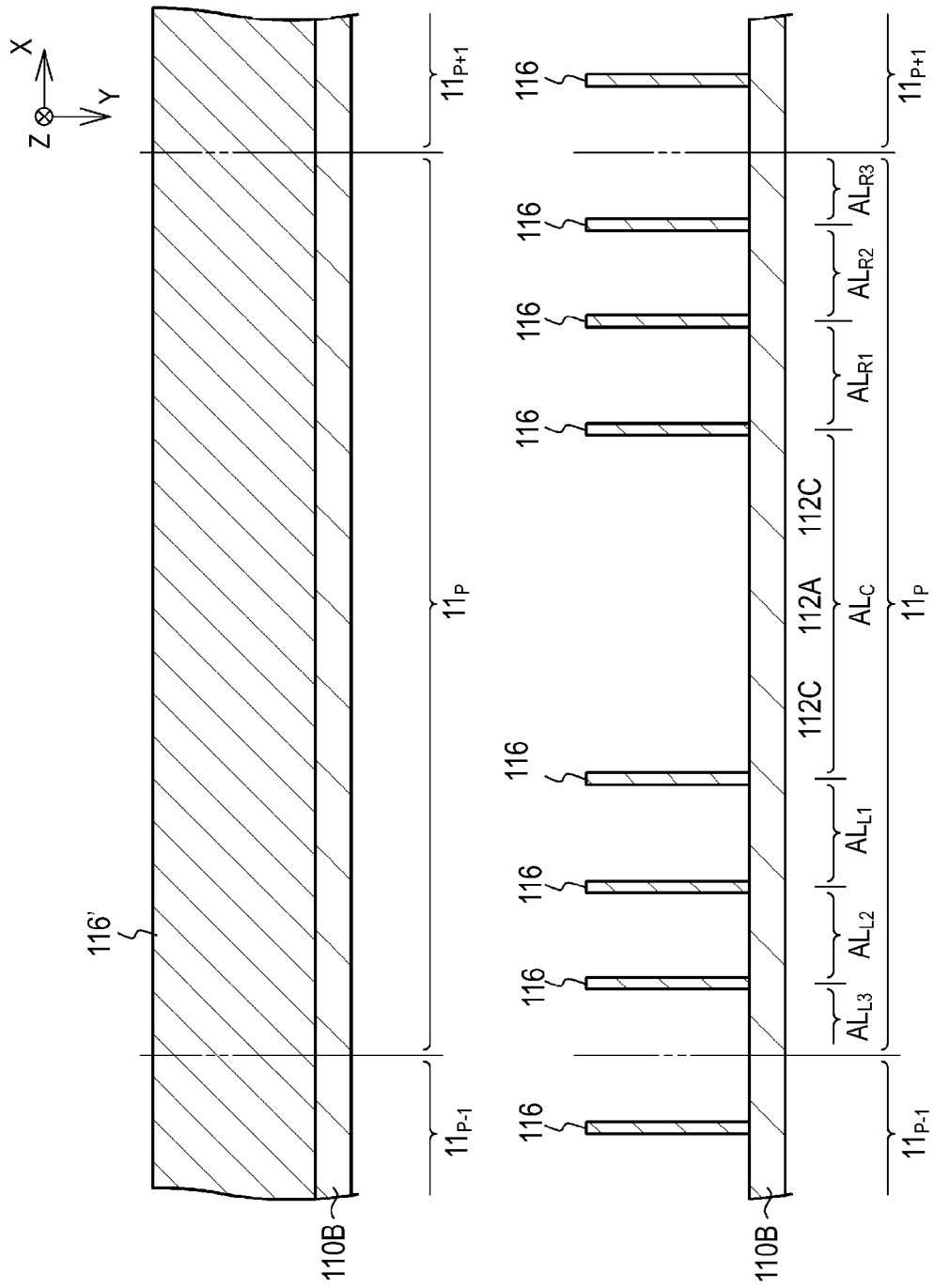

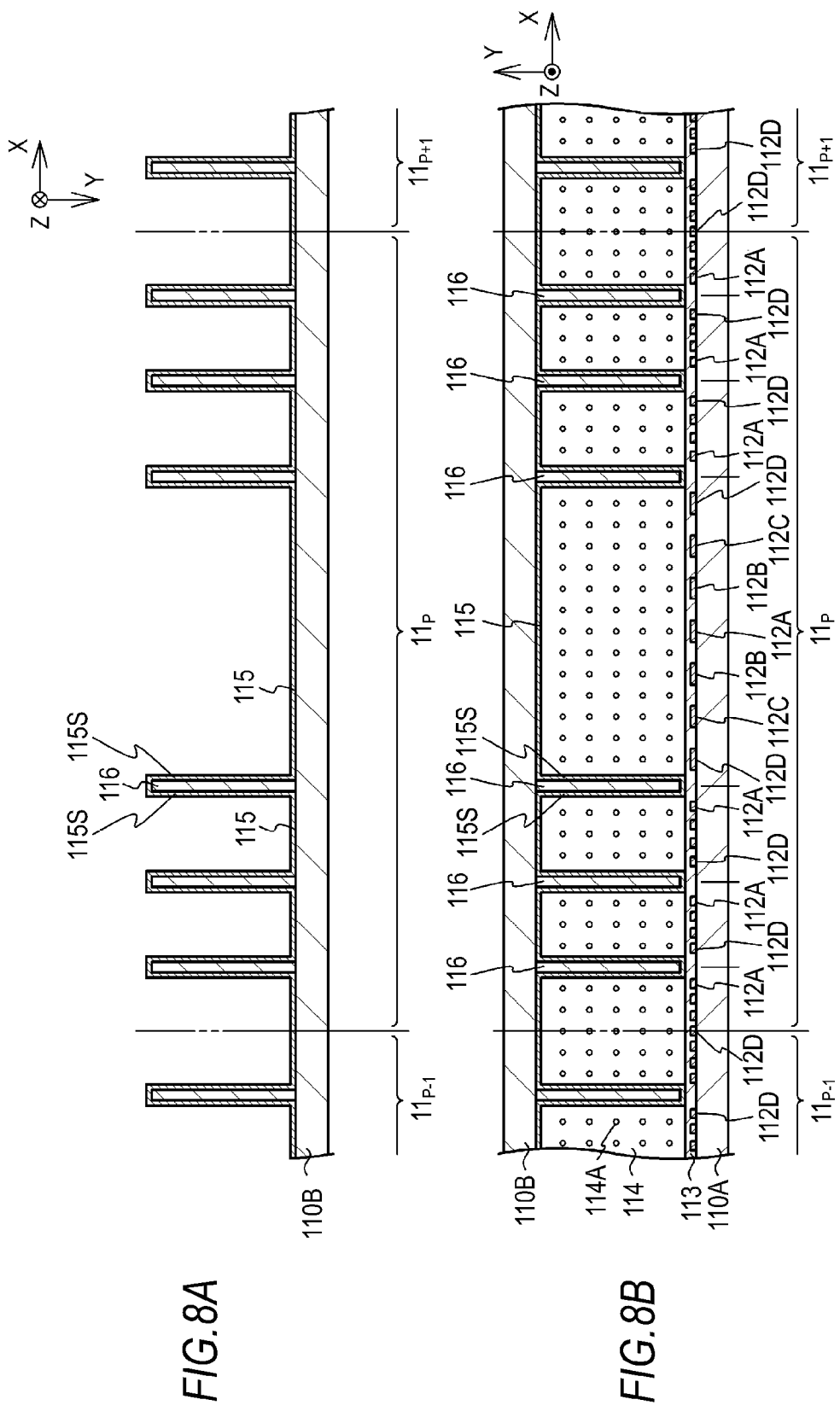

FIG.15
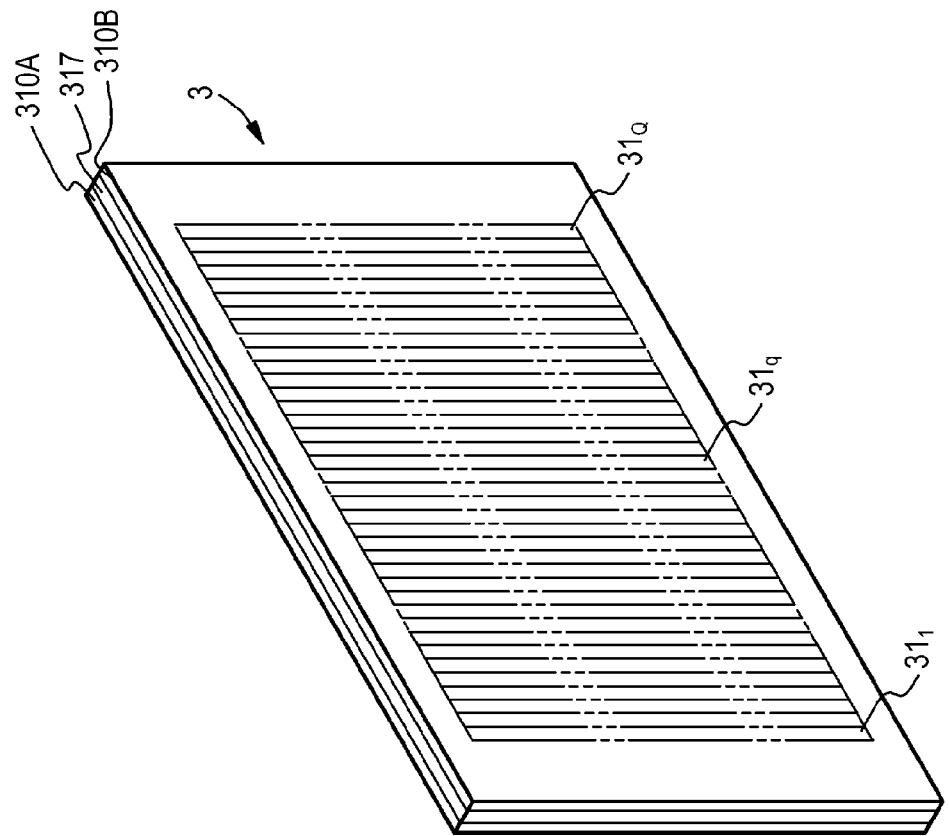
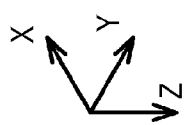

LIQUID CRYSTAL OPTICAL DEVICE

FIELD

The present disclosure relates to a liquid crystal optical device.

BACKGROUND

As an optical device capable of changing refractive power of a lens, for example, a liquid crystal optical device having a structure in which a liquid crystal layer is arranged between a pair of transparent substrates having transparent electrodes is proposed as shown in FIG. 2 of JP-A-2001-133928 (Patent Document 1). In the liquid crystal optical device having the structure, refractive power of the lens can be changed by controlling a retardation distribution in the liquid crystal layer by changing a voltage between the pair of substrates.

In the liquid crystal optical device in which the lens is formed by smoothly changing the retardation distribution in the liquid crystal layer, the thickness of the liquid crystal layer have to be set to be considerably thicker than a liquid crystal layer in a normal liquid crystal display panel because an optical lens is formed. Therefore, response speed of the liquid crystal layer is reduced.

In a normal optical lens, the thickness can be reduced by applying a so-called Fresnel lens having a saw-tooth cross section. Also in the liquid crystal optical device, the Fresnel lens is formed by changing the retardation distribution in the liquid crystal layer in respective given areas to be a saw-tooth distribution, thereby allowing the thickness of the liquid crystal layer to be set thinner and increasing the response speed.

SUMMARY

However, in the structure in which the retardation distribution in the liquid crystal layer is changed in respective given areas to be the saw-tooth distribution, disorder occurs in an alignment state of the liquid crystal layer at boundaries of areas, which deteriorates optical characteristics.

In view of the above, it is desirable to provide a liquid crystal optical device capable of alleviating the deterioration of optical characteristics due to the disorder of the alignment state in the liquid crystal layer.

An embodiment of the present disclosure is directed to a liquid crystal optical device including a first substrate having transparent plural strip electrodes formed to make groups in respective given areas, a second substrate having a transparent common electrode, and a liquid crystal layer arranged between the first substrate and the second substrate, in which a retardation distribution is controlled in respective given areas according to voltages to be applied between the common electrode and the strip electrodes, in which wall spacers are provided at portions corresponding to boundaries of given areas between the first substrate and the second substrate, and a shield electrode to which a fixed value voltage is applied is provided on at least one of two wall surfaces of each spacer.

In the liquid crystal optical device according to the embodiment of the present disclosure, wall spacers are provided at portions corresponding to boundaries of given areas between the first substrate and the second substrate, and the shield electrode to which a fixed value voltage is applied is provided on at least one of two wall surfaces of each spacer. Accordingly, as leakage of an electric field can be suppressed by the shield electrode, disorder of an alignment state of the liquid crystal layer at the boundary of areas can be alleviated. As a result, it is possible to alleviate optical characteristics.

BRIEF DESCRIPTION OF THE DRAWINGS

FIG. 4 is a schematic plan view showing a rear surface of the liquid crystal optical device;

FIG. 5 is a cross-sectional view taken along A-A line of FIG. 3, which schematically shows a state in which the liquid crystal optical device forms a Fresnel lens;

FIGS. 7A and 7B are partial schematic cross-sectional views of a second substrate and the like for explaining the manufacturing method of the liquid crystal optical device continued from FIG. 6C;

FIGS. 8A and 8B are partial schematic cross-sectional views for explaining the manufacturing method of the liquid crystal optical device continued from FIG. 7B;

FIG. 15 is a schematic perspective view of a liquid crystal optical device according to a third embodiment;

DETAILED DESCRIPTION

Figure 1:
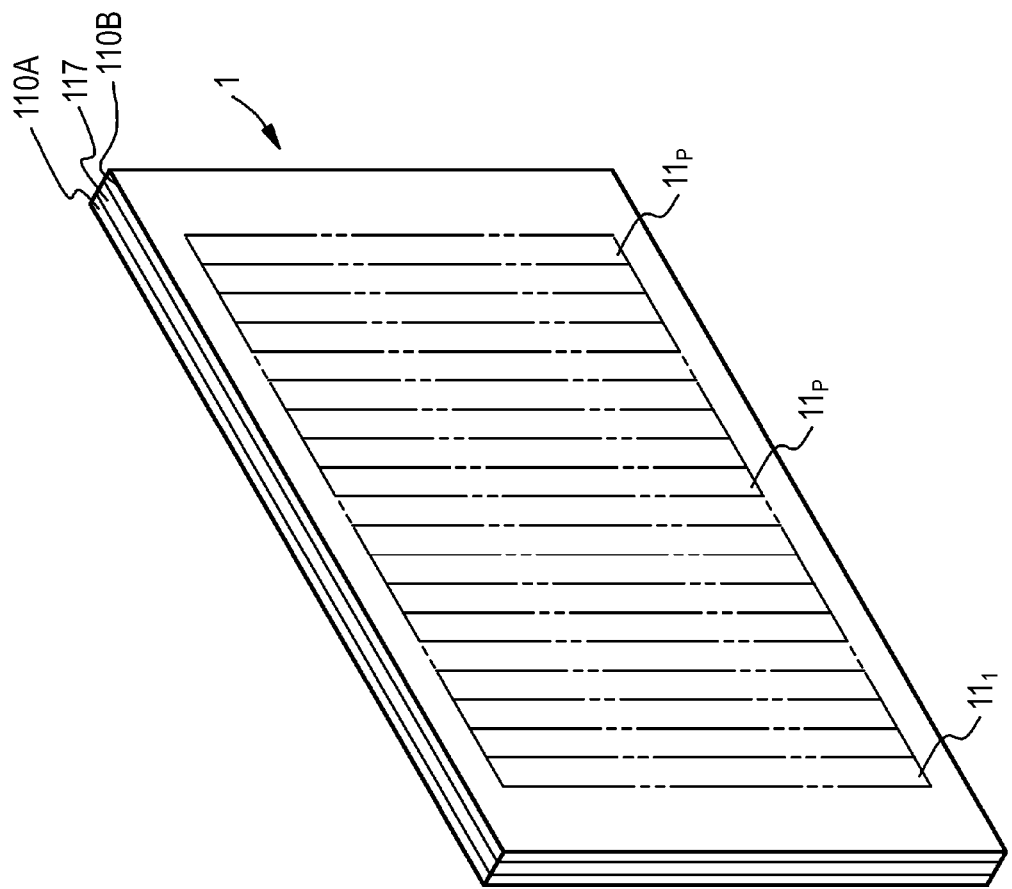
FIG. 1 is a schematic perspective view of a liquid crystal optical device according to a first embodiment.

Hereinafter, the present disclosure will be explained based on embodiments with reference to the drawings. The present disclosure is not limited to embodiments and various numerals and materials in the embodiments are cited as examples. In the following explanation, the same numerals and signs are assigned to the same components or components including the same functions in principle, and repeated explanation is omitted. The explanation will be made in the following order.

1. Explanation concerning the entire liquid crystal optical device according to embodiments of the present disclosure
2. First Embodiment
3. Second Embodiment
4. Third Embodiment (etc.)

[Explanation Concerning the Entire Liquid Crystal Optical Device According to Embodiments of the Present Disclosure]

In a liquid crystal optical device according to embodiments of the present disclosure, voltage values to be applied to shield electrodes can be appropriately selected according to design. It is preferable that a voltage of the same fixed value is applied to a common electrode and the shield electrodes from a perspective that types of voltages to be applied are reduced.

Spacers may be formed on a surface of a first substrate facing the liquid crystal layer or may be formed on a surface of a second substrate facing the liquid crystal layer. It is preferable that the spacers are formed on the second substrate facing the liquid crystal layer from a perspective of easiness in forming strip electrodes. In this structure, the shield electrodes can be formed as electrodes integrated with the common electrode by forming, for example, a conductive material layer on the whole surface including the spacers.

As described above, the first substrate includes transparent plural strip electrodes formed to make groups in respective given areas. As arrangement of the groups of strip electrodes and voltage values to be applied to respective strip electrodes are appropriately set, the liquid crystal optical device can operate as a Fresnel lens controlled according to voltages to be applied between the common electrode and the strip electrodes, or the liquid crystal optical device can operate as a Fresnel prism controlled according to voltages to be applied between the common electrode and the strip electrodes.

The strip electrodes can be formed in straight lines extending in one direction. In this case, the liquid crystal optical device operates as a straight-line Fresnel lens (linear Fresnel lens) or a straight-line Fresnel prism depending on the arrangement of groups of strip electrodes or setting of voltage values to be applied to respective strip electrodes. It is also possible to apply a structure in which the strip electrodes are formed in an annular shape (for example, a concentric shape). When the liquid crystal device operates as the lens, the liquid crystal device operates as the normal Fresnel lens.

When a DC voltage is continuously applied to the liquid crystal layer, deterioration of a liquid crystal material is caused. Accordingly, it is preferable that the liquid crystal optical device is driven so that the polarity of the voltage between the common electrode and the strip electrodes is sequentially inverted in the same manner as the normal liquid crystal display panel.

The first substrate and the second substrate can be made of materials transparent with respect to light. As materials forming the first substrate and the second substrate, acrylic resin, polycarbonate resin (PC), ABS resin, polymethyl methacrylate (PMMA), Polyalylate resin (PAR), Polyethylene terephthalate (PET) and glass can be cited as examples. The first substrate and the second substrate may be made of the same material or may be made of different materials.

The common electrode and the strip electrodes can be made of a metal thin film having light permeability or transparent conductive materials such as an indium tin oxide (ITO) and indium zinc oxide (IZO). These electrodes can be deposited by well-known methods such as physical vapor deposition methods (PVD methods) exemplified by a vacuum deposition method, a sputtering method and so on and various chemical vapor deposition methods (CVD methods). The strip electrodes can be patterned by well-known methods such as combination of a photolithography method and an etching method and a lift-off method.

As materials forming the liquid crystal layer, widely-known materials such as nematic liquid crystal materials can be used. Materials forming the liquid crystal layer are not particularly limited. It is possible to use positive-type liquid crystal materials as well as to use negative-type liquid crystal materials. Note that a so-called blue-phase liquid crystal material layer can be used.

It is also preferable that alignment processing for setting an alignment direction or a pretilt angle of liquid crystal molecules is performed on at least one of surfaces facing the liquid crystal layer in the first substrate and the second substrate. The alignment processing can be performed by well-known methods such that an alignment film to which rubbing processing is performed is formed. The alignment film can be formed by using well-known materials such as polyimide materials.

A method of forming wall spacers is not particularly limited. For example, a screen printing method and a photosensitive method can be cited as the method of forming the spacers. In the screen printing method, openings are formed at screen portions corresponding to portions in which the spacers are formed, a material for forming spacers on the screen portions is allowed to pass through the openings by a squeegee and a material layer for forming spacers is formed on a substrate, then, curing processing is performed according to need. In the photosensitive method, a material layer for forming spacers having photosensitivity is formed on a substrate and the material layer for forming spacers is patterned by exposure or development. The spacers can be made of well-known materials such as transparent polymer materials.

A seal portion sealing between an outer peripheral portion of the first substrate and an outer peripheral portion of the second substrate can be formed by using, for example, well-known sealants such as a thermosetting epoxy resin material.

A display unit displaying two-dimensional images is combined with the liquid crystal optical device according to an embodiment of the present disclosure, thereby forming, for example, a display device capable of displaying stereoscopic images. As the display unit, widely known display members such as a liquid crystal display panel, an electroluminescence display panel and a plasma display panel can be used. The display unit may perform monochrome display or may perform color display.

When the number of pixels M×N in the display unit is represented by (M, N), as values of (M, N), some of resolutions for image display can be specifically exemplified such as VAG (640, 480), S-VGA (800, 600), XGA (1024, 768), APRC (1152, 900), S-XGA (1280, 1024), U-XGA (1600, 1200), HD-TV (1920, 1080), Q-XGA (2048, 1536), and (3840, 2160), (1920, 1035), (720, 480), (1280, 960) etc., however, the resolution is not limited to these values.

A drive circuit driving the liquid crystal optical device can be formed by various circuits. These circuits can be formed by using well-known circuit devices.

Various conditions described in the present specification are satisfied when strictly approved as well as when substantially approved. Existence of different types of variations occurring in design or in manufacture is allowed.

First Embodiment

A first embodiment relates to a liquid crystal optical device to which the present disclosure is applied.

FIG. 1 is a schematic perspective view of the liquid crystal optical device according to the first embodiment.

In a liquid crystal optical device 1, P-lines of lens lines 11 extending in a first direction are arranged side by side in a second direction different from the first direction. The p-th lens line 11 (p=1, 2 . . . , P) is represented by a lens line $11_p$.

As described later, respective lens lines 11 are included in a Fresnel lens (linear Fresnel lens) configured by changing a retardation distribution of a liquid crystal layer in respective areas. A sign 110A represents the first substrate, a sign 110B represents the second substrate and a sign 117 represent a seal portion, which will be explained in detail later.

For convenience of explanation, a surface formed by a lens line group of the liquid crystal device 1 is parallel to a X-Z plane, and the lens lines 11 are arranged so as to extend in a vertical direction (Z-direction in the drawing) and to be aligned in a horizontal direction (X-direction in the drawing). A direction in which light is emitted from the liquid crystal optical device 1 is a "+Y" direction.

Figure 2:
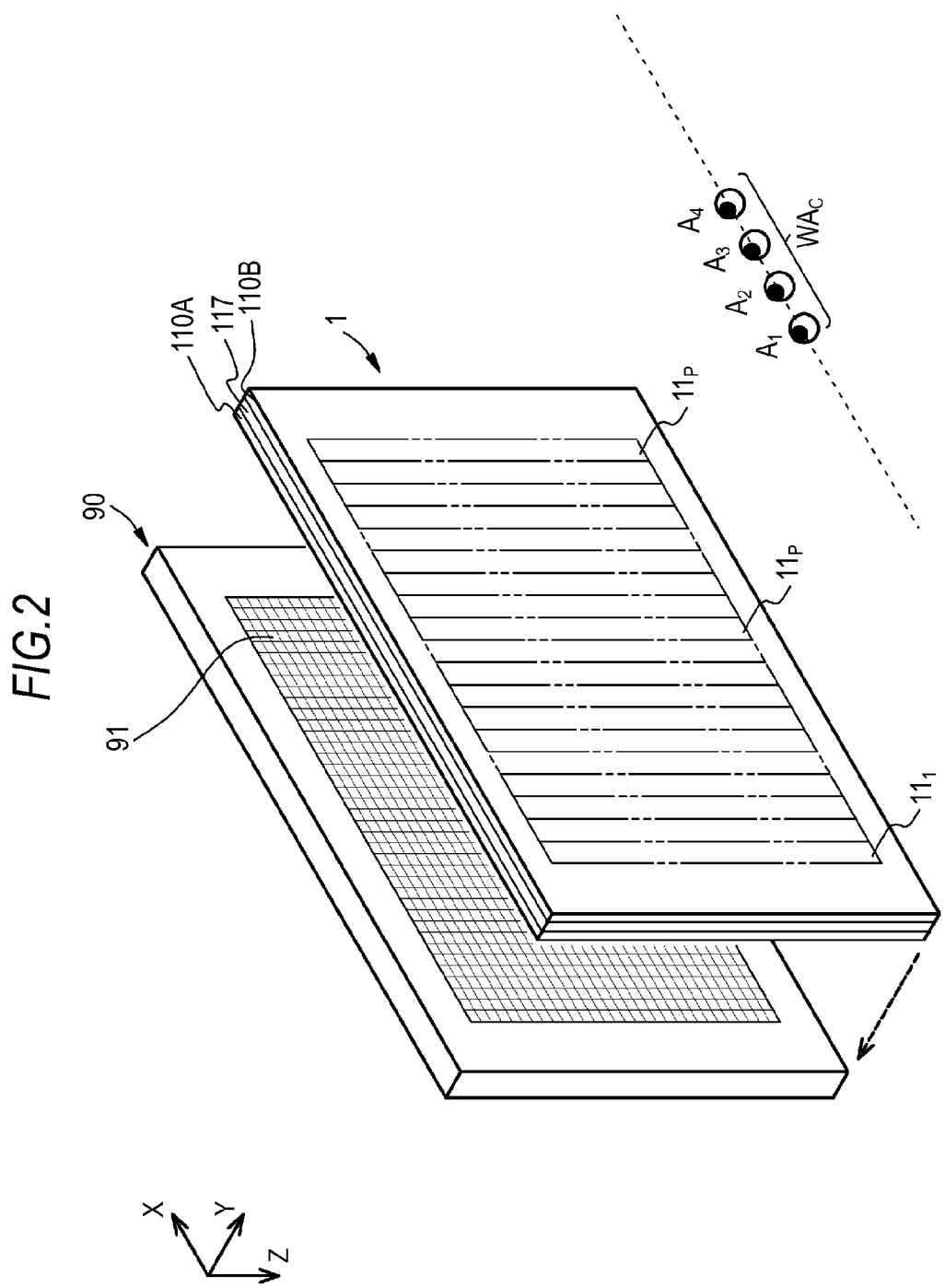
FIG. 2 is a schematic perspective view of a display device applying the liquid crystal optical device.

For example, as shown in FIG. 2, the display device capable of displaying stereoscopic images can be formed by combining a display unit 90 displaying two-dimensional images with the liquid crystal optical device 1 according to the embodiment of the present disclosure. In the example shown in FIG. 2, one lens line 11 corresponds to four lines of pixels 91. The positional relation and the like between the display unit 90 and the lens lines 11 are suitably set, thereby observing images of viewpoints $A_1$ to $A_4$ at an observation area $WA_c$.

As described later, refractive power of the lens lines 11 can be controlled according to voltages to be applied to electrodes of the liquid crystal optical device 1. Accordingly, as it is possible to allow the liquid crystal optical device 1 to operate as a simple transparent plate, a display device capable of displaying normal images as well as displaying stereoscopic images without any problem can be formed.

Figure 3:
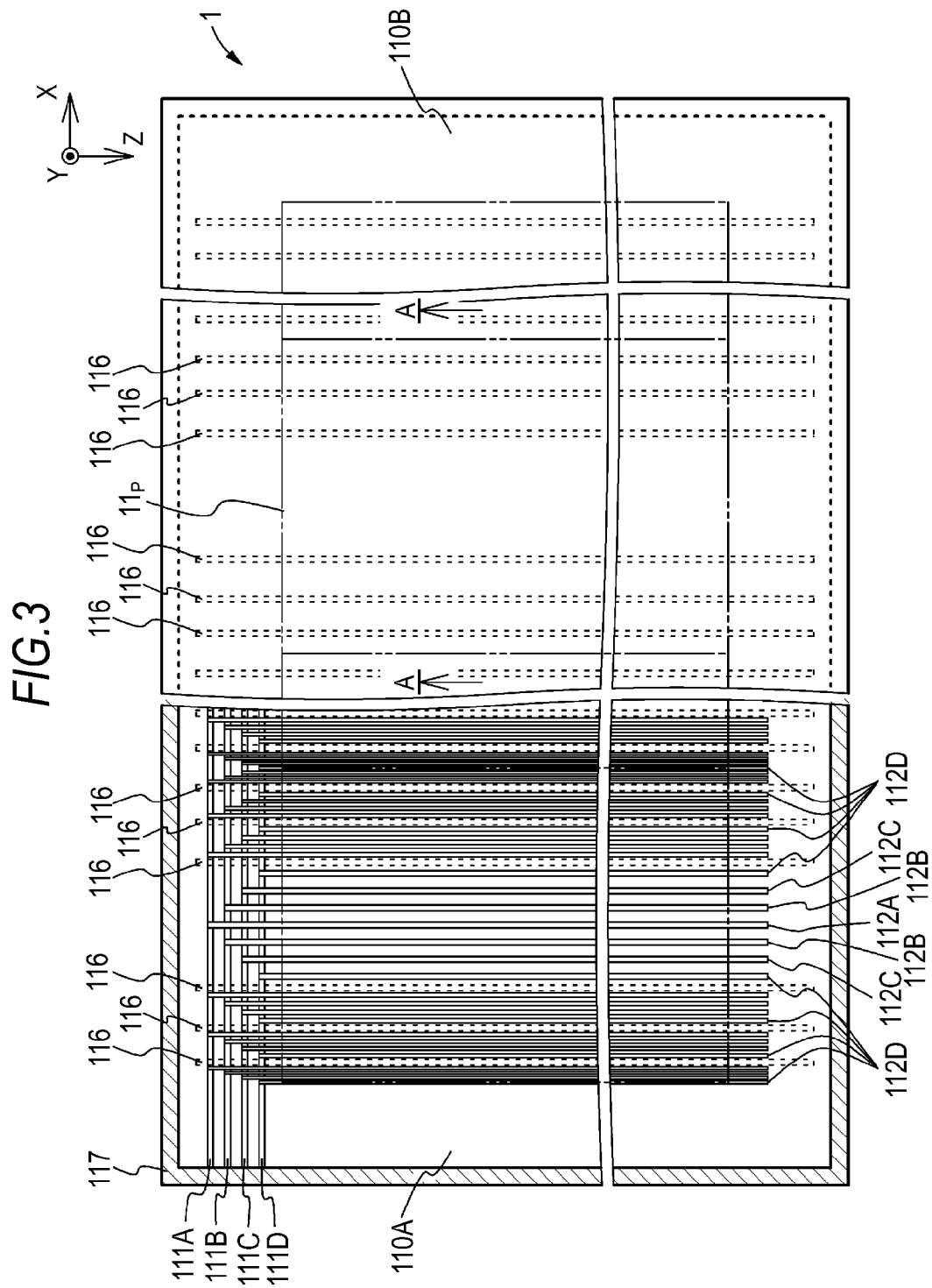
FIG. 3 is a schematic plan view showing a front surface of the liquid crystal optical device.

FIG. 3 is a schematic plan view showing a front surface of the liquid crystal optical device. FIG. 4 is a schematic plan view showing a rear surface of the liquid crystal optical device. FIG. 5 is a cross-sectional view taken along A-A line of FIG. 3, which schematically shows a state in which the liquid crystal optical device forms a Fresnel lens.

The second substrate 110B is shown in a state in which part thereof is cut out in FIG. 3 for convenience illustration. In a portion shown in the state in which part of the second substrate 110B is cut out, the liquid crystal layer and the like are not shown. Similarly, the first substrate 110A is shown in a state in which part thereof is cut out in FIG. 4 and the liquid crystal layer and the like are not shown in a portion shown in the state in which part of the first substrate 110A is cut out.

As shown in FIG. 5 and other drawings, the liquid crystal optical device 1 includes the first substrate 110A having transparent plural strip electrodes 112 (112A, 112B, 112C and 112D) formed to make groups in respective given areas AL ($AL_{L3}, AL_{L2}, AL_{L1}, AL_C, AL_{R1}, AL_{R2}, AL_{R3}$), the second substrate 110B having a transparent common electrode 115, and a liquid crystal layer 114 arranged between the first substrate 110A and the second substrate 110B, in which a retardation distribution is controlled in respective given areas AL according to voltages to be applied between the common electrode 115 and the strip electrodes 112.

When it is not necessary to distinguish the strip electrodes 112A, 112B, 112C and 112D from one another, these may be represented merely as the strip electrodes 112. The same applies to other components such as the areas AL.

The strip electrodes 112 and the common electrode 115 are formed on surfaces (inner surfaces) facing the liquid crystal layer 114 in the first substrate 110A and the second substrate 110B respectively. The strip electrodes 112 and the common electrode 115 are made of a transparent conductive material such as ITO, formed by a well-known deposition technique. The strip electrodes 112 are formed to have a prescribed stripe shape as shown in FIG. 3 by using a well-known patterning technique.

The liquid crystal optical device 1 further includes an alignment film 113 made of, for example, polyamide. The alignment film 113 is formed on the whole surface so as to cover the inner surface of the first substrate 110A including the strip electrodes 112. Rubbing processing is performed on a surface of the alignment film 113 in the Z-direction. A direction of a molecule axis (long axis) of liquid crystal molecules in the case where there is no potential difference between the common electrode 115 and the strip electrodes 112 is prescribed by the alignment film 113.

The liquid crystal layer 114 arranged between the first substrate 110A and the second substrate 110B is made of a positive-type nematic liquid crystal material. A sign 114A schematically represents liquid crystal molecules in the liquid crystal layer 114.

Wall spacers 116 are provided at portions corresponding to boundaries of given areas AL between the first substrate 110A and the second substrate 110B. The spacers 116 are made of a transparent polymer material, which are formed by exposure and development of the material layer for forming spacers having photosensitivity. A shield electrode 115S to which a fixed value voltage is applied is provided on at least one of two wall surfaces (both surfaces in the example shown in FIG. 5) of each spacer 116. The spacers 116 are formed on the inner surface of the second substrate 110B, and the shield electrodes 115S are formed as electrodes integrated with the common electrode 115, which will be explained later with reference to FIG. 6A to FIG. 9.

As shown in FIG. 3, feeding lines 111 (111A, 111B, 111C and 111D) extending in the horizontal direction in the stripe shape are further provided on the first substrate 110A. The feeding lines 111 are also formed in the same manufacturing process as the strip electrodes 112 in principle. It is preferable that the feeding lines 111 are formed by using a metal materials having good conductivity from the perspective that voltages are supplied to a large number of strip electrodes 112.

The strip electrode 112A is connected to the feeding line 111A and the strip electrode 112B is connected to the feeding line 111B. Similarly, the strip electrode 112C is connected to the feeding line 111C and the strip electrode 112D is connected to the feeding line 111D. The contact between the feeding lines 111 and the strip electrodes 112 is not shown in FIG. 3.

As apparent from the above connection relation, respective voltages of the strip electrodes 112A, 112B, 112C and 112D are controlled by voltages to be applied to the feeding lines 111A, 111B, 111C and 111D.

When the liquid crystal optical device 1 is operated, a voltage of the same fixed value (for example, 0V) is applied to the common electrode 115 and the shield electrodes 115S based on an operation of the not-shown drive circuit. Independent voltages are applied to respective feeding lines 111A, 111B, 111C and 111D.

The arrangement of the strip electrodes 112 in respective areas AL and the arrangement of the spacers 116 are explained in detail. As shown in FIG. 3, the strip electrodes 112 are formed in straight lines extending in one direction (Z-direction in the drawing). In the area $AL_C$ positioned at the center of the lens line 11, the strip electrodes 112 are sequentially arranged from the left end (the end close to the area $AL_{L1}$) toward the right end (the end close to the area $AL_{R1}$) in the order of signs 112D, 112C, 112B, 112A, 112B, 112C and 112D as shown in FIG. 5.

In the areas $AL_{L1}$, $AL_{L2}$, $AL_{L3}$ positioned at the left side of the lens lines 11, the strip electrodes 112 are arranged from the left end toward the right end in each area in the order of signs 112D, 112C, 112B and 112A. On the other hand, in the areas $AL_{R1}$, $AL_{R2}$, $AL_{R3}$ positioned at the right side of the lens lines 11, the strip electrodes 112 are arranged from the right end toward the left end in each area in the order of signs 112D, 112C, 112B and 112A. For convenience of illustration, signs 112B and 112C are not shown in areas other than the area $AL_C$ in FIG. 5.

The spacers 116 are formed at a portion corresponding to a boundary between the $AL_{L3}$ and $AL_{L2}$, a portion corresponding to a boundary between $AL_{L2}$ and $AL_{L1}$, a portion corresponding to a boundary between $AL_{L1}$ and $AL_C$, a portion corresponding to a boundary between $AL_C$ and $AL_{R1}$, a portion corresponding to a boundary between $AL_{R1}$ and $AL_{R2}$ and a portion corresponding to a boundary between $AL_{R2}$ and $AL_{R3}$. The spacers 116 are also formed in straight lines extending in one direction (Z-direction in the drawing) as shown in FIG. 4.

The arrangement of the strip electrodes 112 in respective areas AL and the arrangement of the spacers 116 have been explained as the above. As shown in FIG. 5, the strip electrodes 112 and the spacers 116 are arranged to have a symmetric relation with respect to a virtual straight line extending in the Y-direction through the center of the lens line 11.

The height of the spacer 116 in the Y direction (in other words, the thickness of the liquid crystal layer 114) is, for example, 9 [μm], and the width in the X-direction is, for example, 3 [μm]. A length SL of the spacer 116 shown in FIG. 4 is set to be a value in which gaps D1 and D2 are generated between the ends of the spacers 116 and the seal portion 117. Values of the gap D1 and D2 are set so that the liquid crystal material flows between the substrate without any problem at the time of manufacturing the liquid crystal optical device 1.

Hereinafter, a manufacturing method of the liquid crystal optical device 1 will be explained with reference to FIGS. 6A to 6C, FIGS. 7A and 7B and FIGS. 8A and 8B. These drawings are cross-sectional views similar to the A-A cross-sectional view in FIG. 3 in principle. For convenience of illustration, FIGS. 7A, 7B and FIG. 8A are shown in a state in which the direction of the Y-axis is inverted.

Figure 6A:
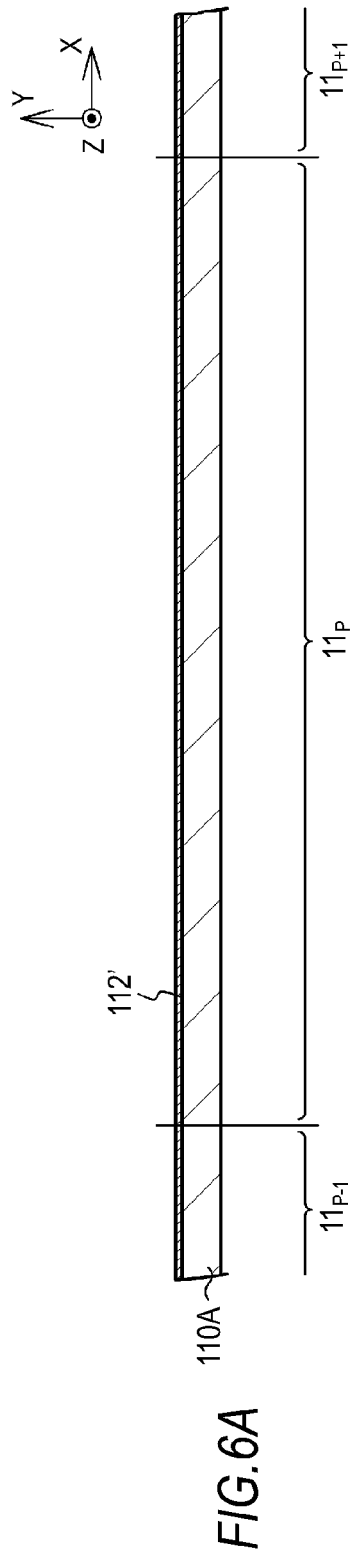
FIGS. 6A to 6C are partial schematic cross-sectional views of a first substrate and the like for explaining a manufacturing method of the liquid crystal optical device.
Figure 6B:
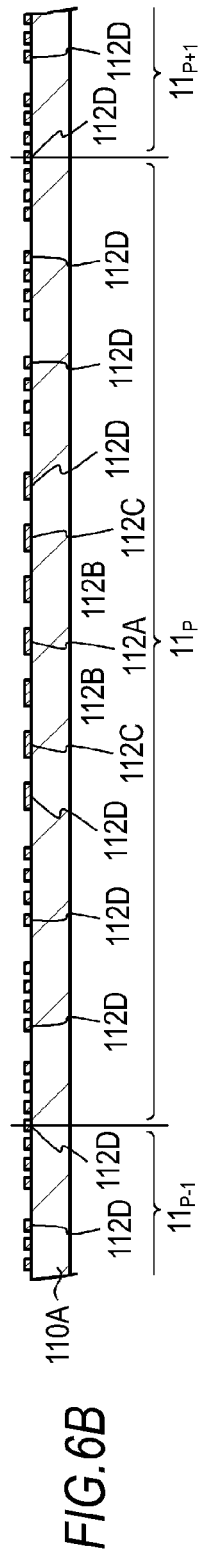

[Process-100] (See FIGS. 6A and 6B)

First, not-shown feeding lines 111 are formed on the first substrate 110A based on a well-known method. Next, a not-shown insulating film covering the feeling lines 111 and having openings at portions to be contacts with respect to the feeding lines 111 and the strip electrodes 112 is formed based on a well-known method.

Subsequently, a conductive material layer 112' made of, for example, ITO is formed on the whole surface including the feeding lines 111 and the like based on a well-known method (FIG. 6A). Next, the conductive material layer 112' is patterned by a well-known method, thereby forming the strip electrodes 112 connected to the feeding lines 111 (FIG. 6B).

Figure 6C:
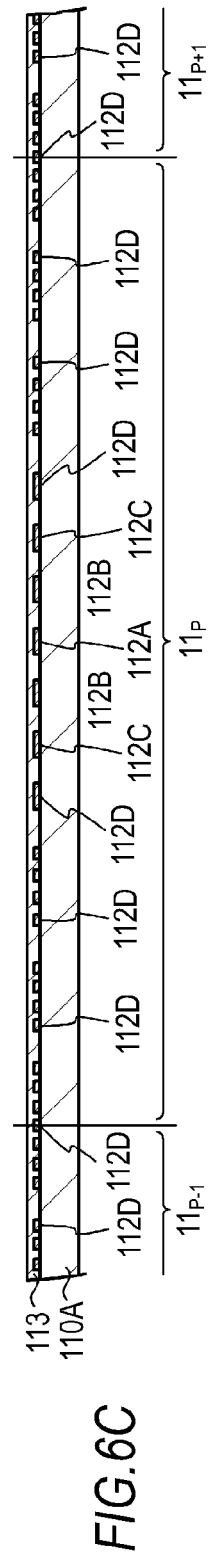

[Process-110] (See FIG. 6C)

Subsequently, the alignment film 113 made of, for example, a polyimide material is formed on the whole surface including the strip electrodes 112 based on a well-known method and rubbing processing is performed on the surface thereof by a well-known method. The direction of the rubbing processing is the Z-direction.

[Process-120] (See FIGS. 7A and 7B)

Next, a transparent polymer material layer 116' having photosensitivity is formed on the second substrate 110B (FIG. 7A). After that, the transparent polymer material layer 116' is patterned so that portions corresponding to boundaries of the areas AL remain by a well-known method, thereby forming the spacers 116 (FIG. 7B).

[Process-130] (See FIG. 8A)

Next, a conductive material layer made of, for example, ITO is formed on the whole surface of the second substrate 110B including the spacers 116 based on a well-known method. Accordingly, the common electrode 115 and the shield electrodes 115S on the wall surfaces of the spacers 116 can be formed as integrated electrodes.

[Process-140] (See FIG. 8B)

Then, the first substrate 110A and the second substrate 110B to which the above processes are performed are allowed to face each other so as to sandwich the liquid crystal material and the periphery of these substrates is sealed, thereby obtaining the liquid crystal optical device 1. When a voltage is not applied to the liquid crystal layer 114, the long axes of the liquid crystal molecules 114A are aligned in the Z-direction.

Subsequently, an operation of the liquid crystal optical device 1 will be explained with reference to FIG. 5 and FIG. 9. Assume that light in which a polarization direction is the Z-direction due to a not-shown polarizing film is incident on the liquid crystal optical device 1.

As described above, FIG. 5 is the A-A cross-sectional view of FIG. 3, which schematically shows the state in which the liquid crystal optical device 1 forms the Fresnel lens.

In the above state, a voltage of 0 (zero)V is applied to the common electrode 115 and the shield electrodes 115S. Voltages 0 (zero)V, 1V, 2V and 3V are applied to the feeding lines 111A, 111B, 111C and 111D shown in FIG. 3 respectively. Therefore, voltages of the strip electrodes 112A, 112B, 112C and 112D connected to respective feeding lines 111A, 111B, 111C and 111D will be voltages 0 (zero)V, 1V, 2V and 3V, respectively. Actually, the polarity of voltages of the feeding lines 111 is switched, for example, in a prescribed cycle for driving the liquid crystal layer 114 by AC current. The inversion of the voltage polarity is not considered for convenience of explanation. The same applies to explanation of other embodiments.

A voltage between the strip electrodes 112D and the common electrode 115 is 3V. Accordingly, an electric field is formed between the strip electrodes 112D and the common electrode 115 and the long axes of the liquid crystal molecules 114A are aligned in the Y-direction. A voltage between the strip electrodes 112C and the common electrode 115 is 2V. Accordingly, an electric field weaker than the above is formed between the strip electrodes 112C and the common electrode 115. The long axes of the liquid crystal molecules 114A are aligned in the Y-direction, however, the degree of alignment is weaker. Similarly, a voltage between the strip electrodes 112B and the common electrode 115 is 1V. Accordingly, an electric field is formed also between the strip electrodes 112B and the common electrode 115. The long axes of the liquid crystal molecules 114A are aligned in the Y-direction, however, the degree of alignment will be further weaker.

On the other hand, a voltage between the strip electrodes 112A and the common electrode 115 is 0 (zero)V. Therefore, an electric field is not formed between the strip electrodes 112A and the common electrode 115, and the long axes of the liquid crystal molecules 114A remain in the Z-direction.

A refractive index of the liquid crystal molecules 114A in a long-axis direction is higher than a refractive index in a short-axis direction. Accordingly, in the distribution of retardation (phase difference) in the liquid crystal layer 114 with respect to light in which the polarization axis is the Z-direction, the retardation is high at portions corresponding to the strip electrodes 112A and is reduced toward the strip electrodes 112D. A graph shown in FIG. 5 schematically represents a retardation distribution. Graphs in other drawings also represent retardation distributions.

As described above, the strip electrodes 112 are arranged to have the symmetric relation with respect to the virtual straight line extending in the Y-direction through the center of the lens line 11. As a result, the retardation distribution in the areas $AL_{L3}$ to $AL_{R3}$ will be a saw-tooth distribution which is symmetric with respect to the virtual straight line extending in the Y-direction through the center of the lens line 11. Optically, the liquid crystal layer 114 can be equated with the Fresnel lens having a saw-tooth cross section.

As described above, the liquid crystal optical device 1 operates as the Fresnel lens controlled according to voltages applied between the common electrode 115 and the strip electrodes 112. More specifically, the lens line 11 operates as a linear Fresnel lens extending in the Z-direction.

Next, an operation performed when the electric field is not formed between the strip electrodes 112 and the common electrode 115 will be explained.

Figure 9:
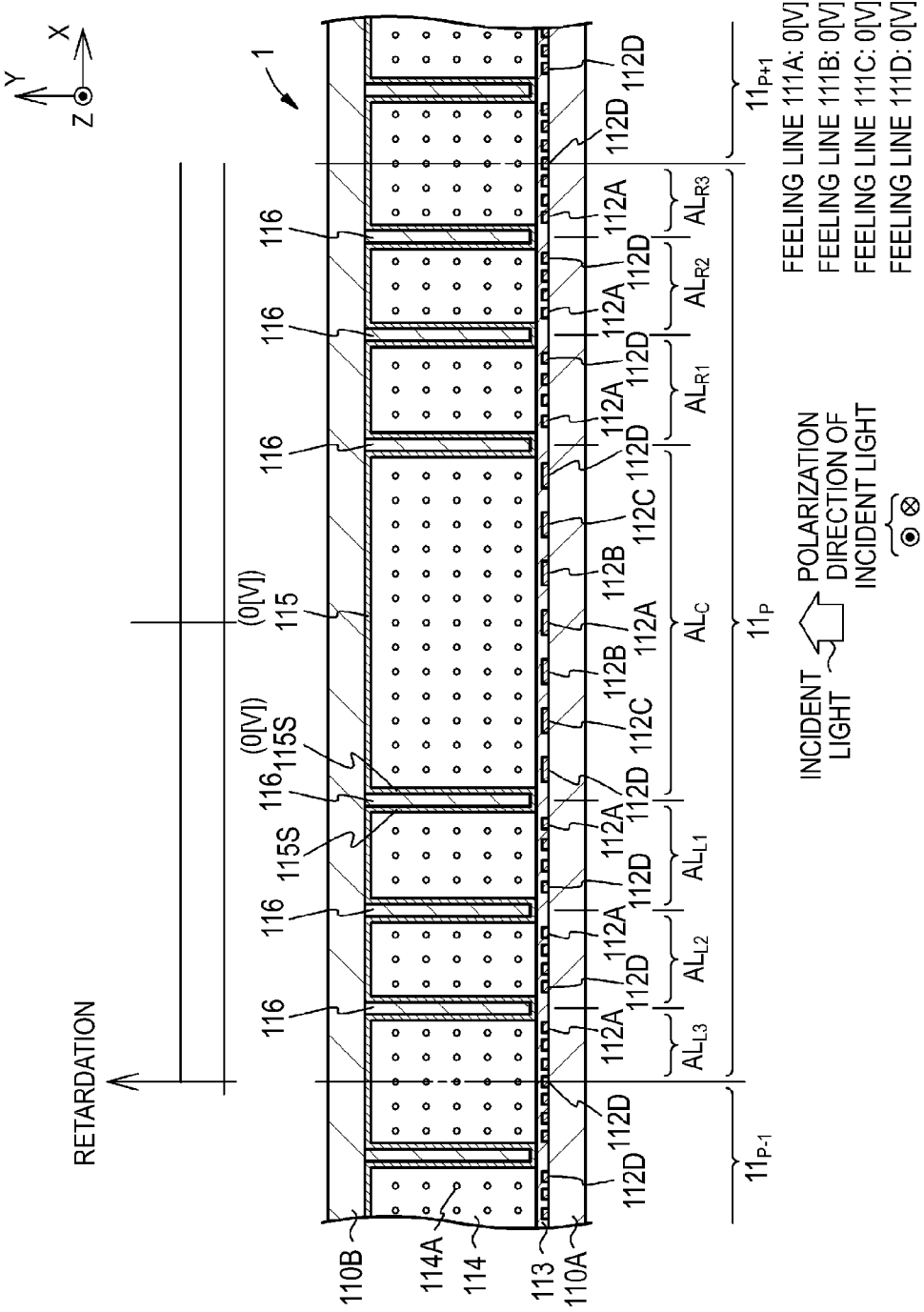
FIG. 9 is a cross-sectional view taken along A-A line of FIG. 3, which schematically shows a state in which a voltage is not applied to a liquid crystal layer.

FIG. 9 is a cross-sectional view taken along A-A line of FIG. 3, which schematically shows a state in which a voltage is not applied to the liquid crystal layer.

In the above state, the voltage of 0 (zero)V is applied to the common electrode 115 and the shield electrodes 115S. The voltage of 0 (zero)V is applied to all feeding lines 111A, 111B, 111C and 111D. Therefore, an electric field is not formed between the common electrode 115 and the strip electrodes 112A, 112B, 112C and 112D, and the long axes of the liquid crystal molecules remain in the Z-direction.

Accordingly, a retardation distribution in the areas $AL_{L3}$ to $AL_{R3}$ is uniform. Optically, the liquid crystal layer 114 operates as a simple transparent layer.

The operation of the liquid crystal optical device 1 has been explained. Here, disorder in an electric field distribution in the vicinity of the boundary of the areas AL in the case where the liquid crystal optical device 1 forms the Fresnel lens will be explained.

For example, when focusing attention to the area $AL_C$ and the area $AL_{R1}$ in FIG. 5, the strip electrode 112D (0V) and the strip electrode 112A (3V) are arranged side by side so as to sandwich the boundary between areas. In the case where the shield electrodes 115S are not formed on the wall surface of the spacer 116, an electric field having a component of the X-direction is formed between the strip electrode 112D and the strip electrode 112A, which causes disorder in an alignment state of the liquid crystal layer 114 at the boundary. The same phenomenon occurs also at other adjacent areas, as a result, the retardation distribution in the liquid crystal layer 114 is disordered.

The disorder in the alignment state of the liquid crystal layer 114 at boundaries is alleviated by providing the shield electrodes 115S on the wall surfaces of the spacers 116. The explanation will be made below with reference to FIG. 10.

Figure 10:
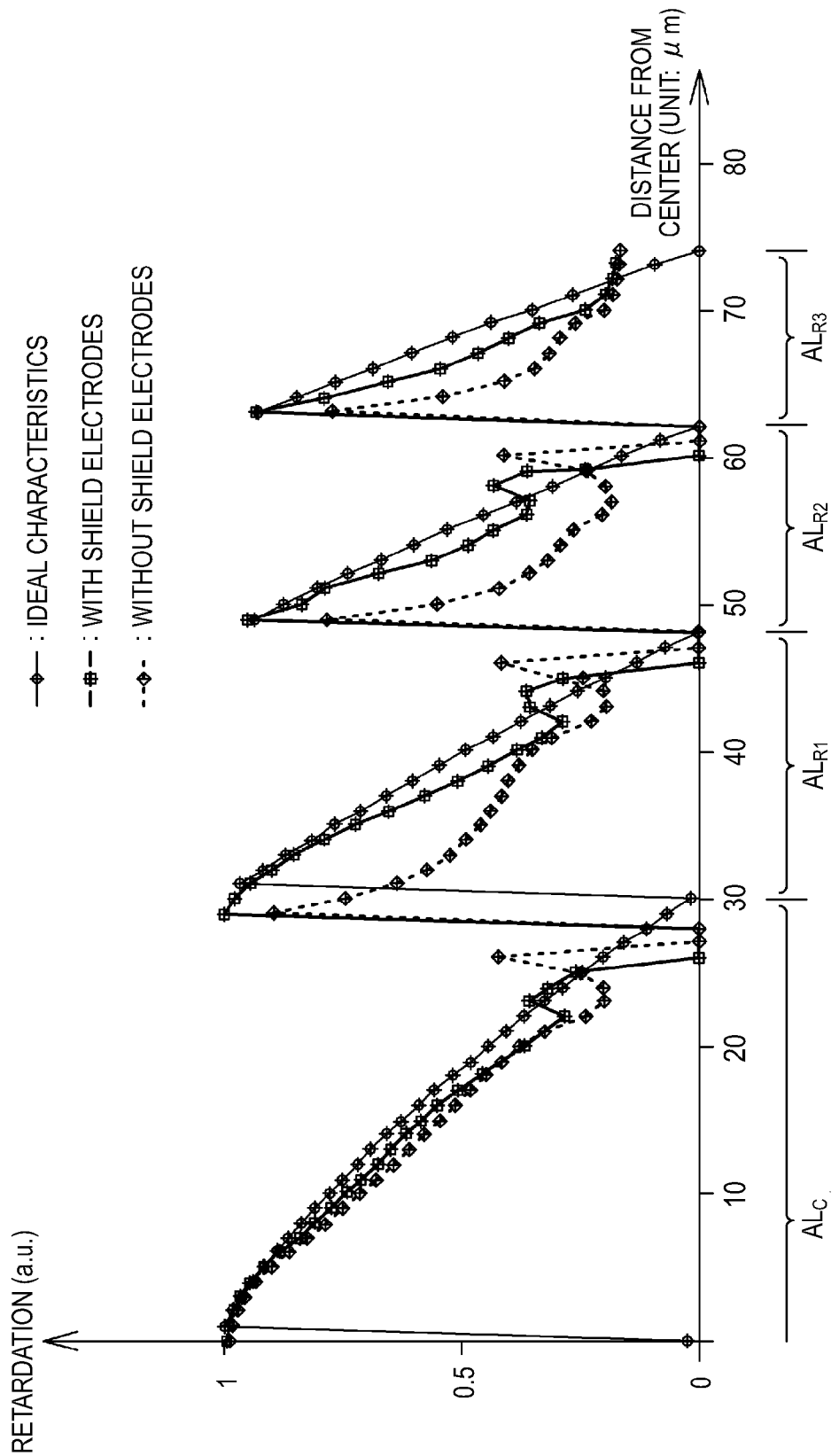
FIG. 10 is a graph for explaining characteristic variation due to existence of the shield electrodes formed on side surfaces of the spacers.

FIG. 10 is a graph for explaining characteristic variation due to existence of the shield electrodes formed on side surfaces of the spacers.

The graphs shown in FIG. 10 show simulation results of retardations obtained when voltages explained with reference to FIG. 5 are applied to the strip electrodes 112, in which the traverse width of the lens line 11 is $1.5 \times 10^2$ [μm] and the width of the liquid crystal layer 114 is 9 [μm]. The simulation has been performed with respect to the right half of the lens line 11 including the areas $AL_{R1}$ to $AL_{R3}$ in consideration of the symmetric property of the lens line 11.

A graph represented by thin solid lines shows an ideal retardation distribution. A graph represented by bold solid lines shows a retardation distribution in the case where the shield electrodes 115S shown in FIG. 5 are formed. A graph represented by dashed lines shows a retardation distribution in the case where the shield electrodes 115S shown in FIG. 5 are not formed.

As apparent by comparing the graph of the thin solid lines with the graph of the bold lines, the retardation distributions are significantly deviated from the ideal curves in all areas $AL_{R1}$ to $AL_{R3}$ when the shield electrodes 115S are not formed. On the other hand, the graph of the bold solid lines shows a behavior similar to the graph of the thin solid lines. Accordingly, the degree of disorder in the retardation distribution can be alleviated by providing the shield electrodes 115S.

The first embodiment has been explained as the above. Though the structure in which light is incident from the side of the first substrate 110A has been explained as the above, a structure in which light is incident from the side of the second substrate 110B can be applied. It is also preferable that an optical member such as a polarizing film for prescribing the polarization direction of incident light is provided on a surface on which light is incident.

Figure 11:
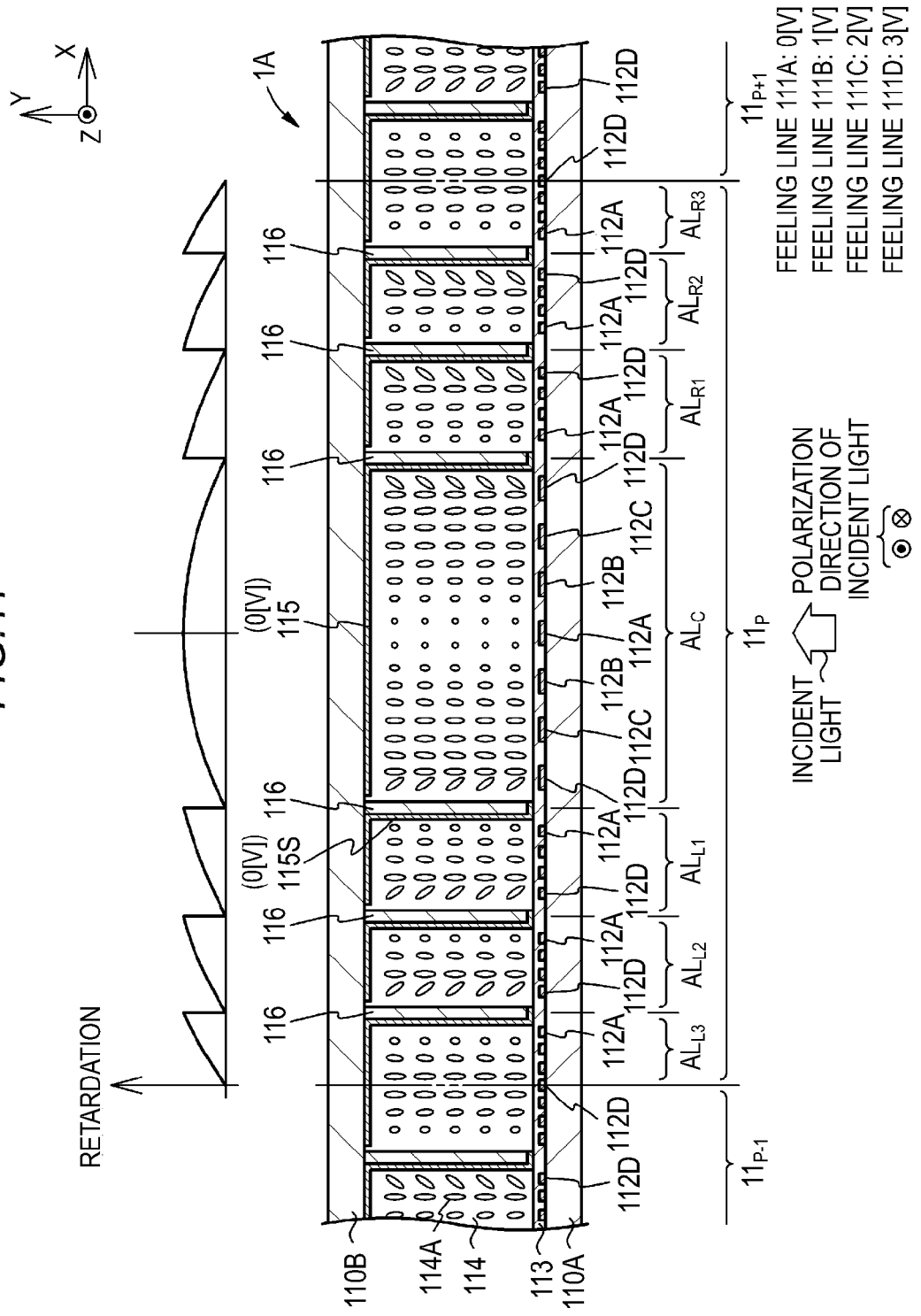
FIG. 11 is a schematic partial cross-sectional view of a liquid crystal optical device according to a first modification example.

Though the structure in which the shield electrodes 115S are formed on both sides of two wall surfaces of the spacer 116 has been explained as the above, the shield electrode 115S may be formed on either side of the two wall surfaces. FIG. 11 shows a partial cross-sectional view of a liquid crystal optical device 1A according to a modification example.

A structure shown in FIG. 11 can be obtained by, for example, performing oblique deposition of ITO in the formation of the conductive material layer shown in FIG. 8A.

Figure 12:
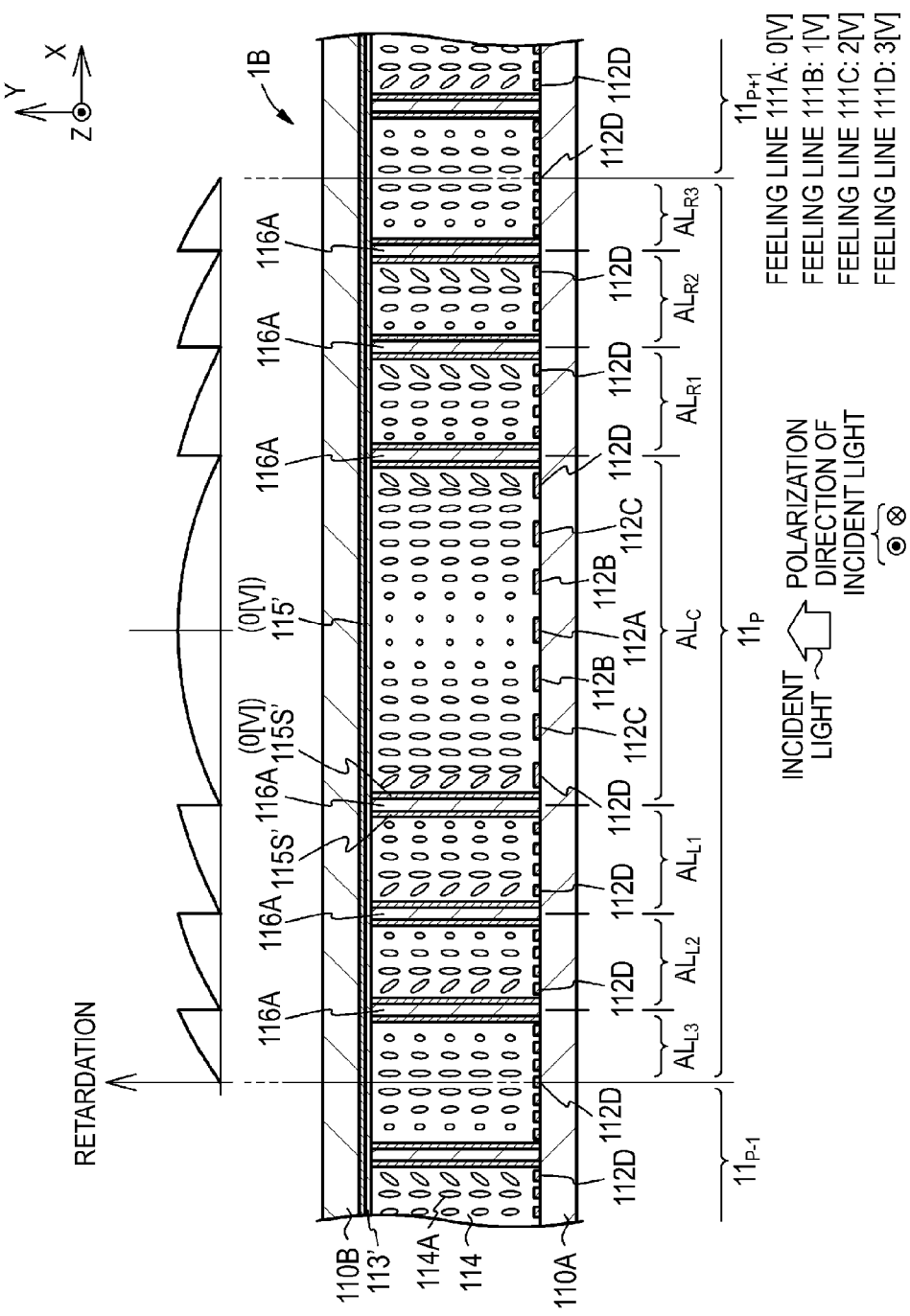
FIG. 12 is a schematic partial cross-sectional view of a liquid crystal optical device according to a second modification example.

Though the structure in which the spacers 116 are formed on the first substrate 110A has been explained as the above, spacers 116 may be formed on the second substrate 110B. FIG. 12 shows a schematic partial cross-sectional view of a liquid crystal optical device 1B according to a modification example. A sign 116A represents a spacer and a sign 113' represents an alignment film. A sign 115' represents a common electrode and a sign 115S' represent a shield electrode. Though the structure in which the shield electrodes 115S' are formed on both two wall surfaces of the spacer 116A has been explained, the shield electrode 115S' may be formed on either side. The structure has an advantage that the tolerance of overlapping displacement with respect to the second substrate 110B can be reduced.

Though the structure in which the plural lens lines are provided has been explained as the above, it is also preferable that one lens line is provided. It is further preferable that the strip electrodes are formed in an annular shape. For example, it is possible to form a Fresnel lens in which the strip electrodes are rotated about a virtual straight line as a central axis which extends in the Y-direction through the center of the lens line 11 in FIG. 5.

Second Embodiment

A second embodiment also relates to the liquid crystal optical device to which the present disclosure is applied.

The second embodiment differs from the first embodiment in the structure of strip electrodes on the first substrate. Specifically, part of the strip electrodes is omitted in some areas. The second embodiment has the same structure as the first embodiment other than the above point.

When a liquid crystal optical device 2 is operated, a voltage of the same fixed value (for example, 0V) is applied to the common electrode 115 and the shield electrodes 115S based on the operation of a not-shown drive circuit in the same manner as the first embodiment. Independent voltages are applied to respective feeding lines 111A, 111B, 111C and 111D.

A schematic perspective view of the liquid crystal optical device 2 according to the second embodiment is a drawing in which the liquid crystal optical device 1 shown in FIG. 1 is replaced with the liquid crystal optical device 2.

Figure 13:
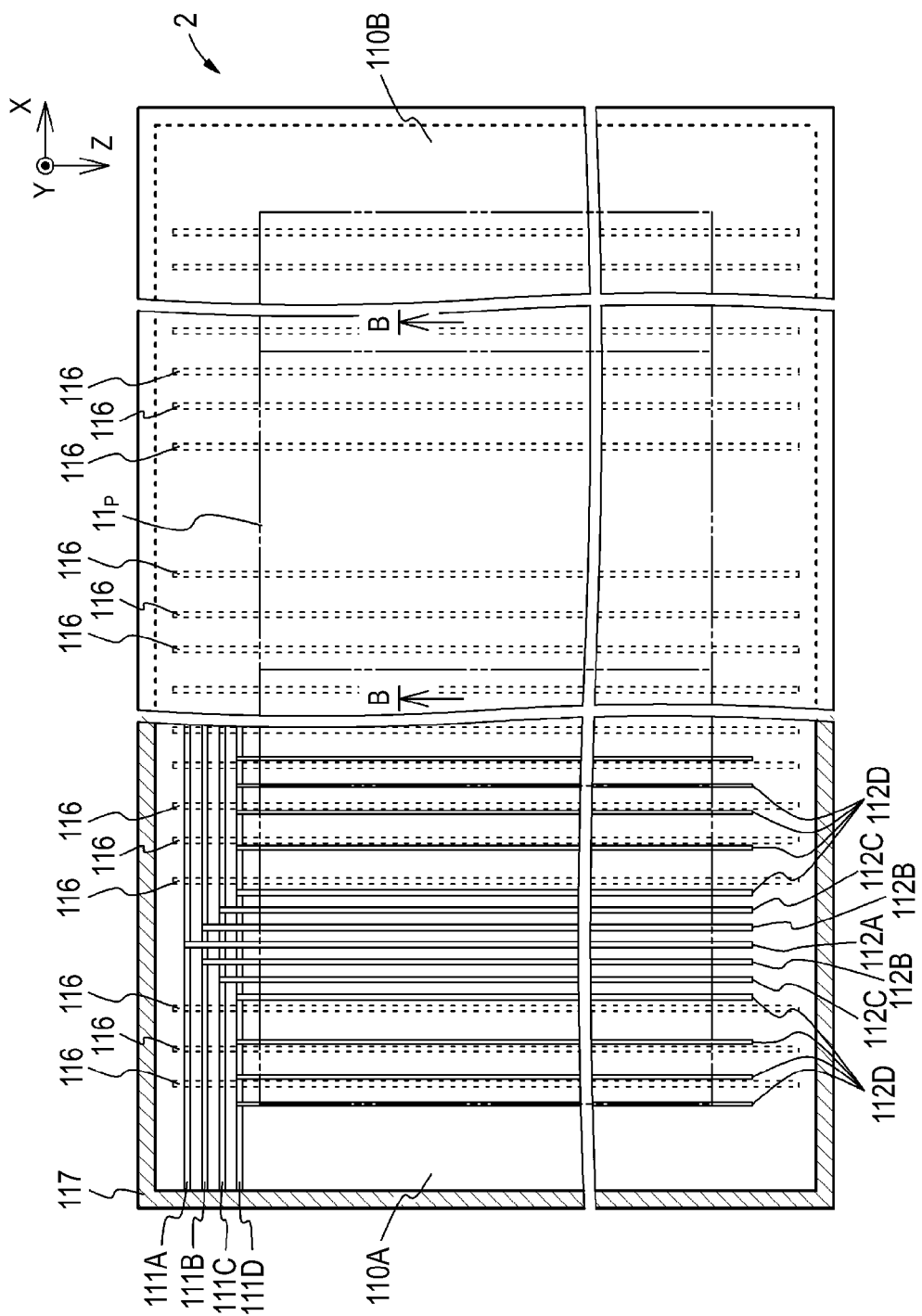
FIG. 13 is a schematic plan view showing a front surface of a liquid crystal optical device according to a second embodiment.
Figure 14:
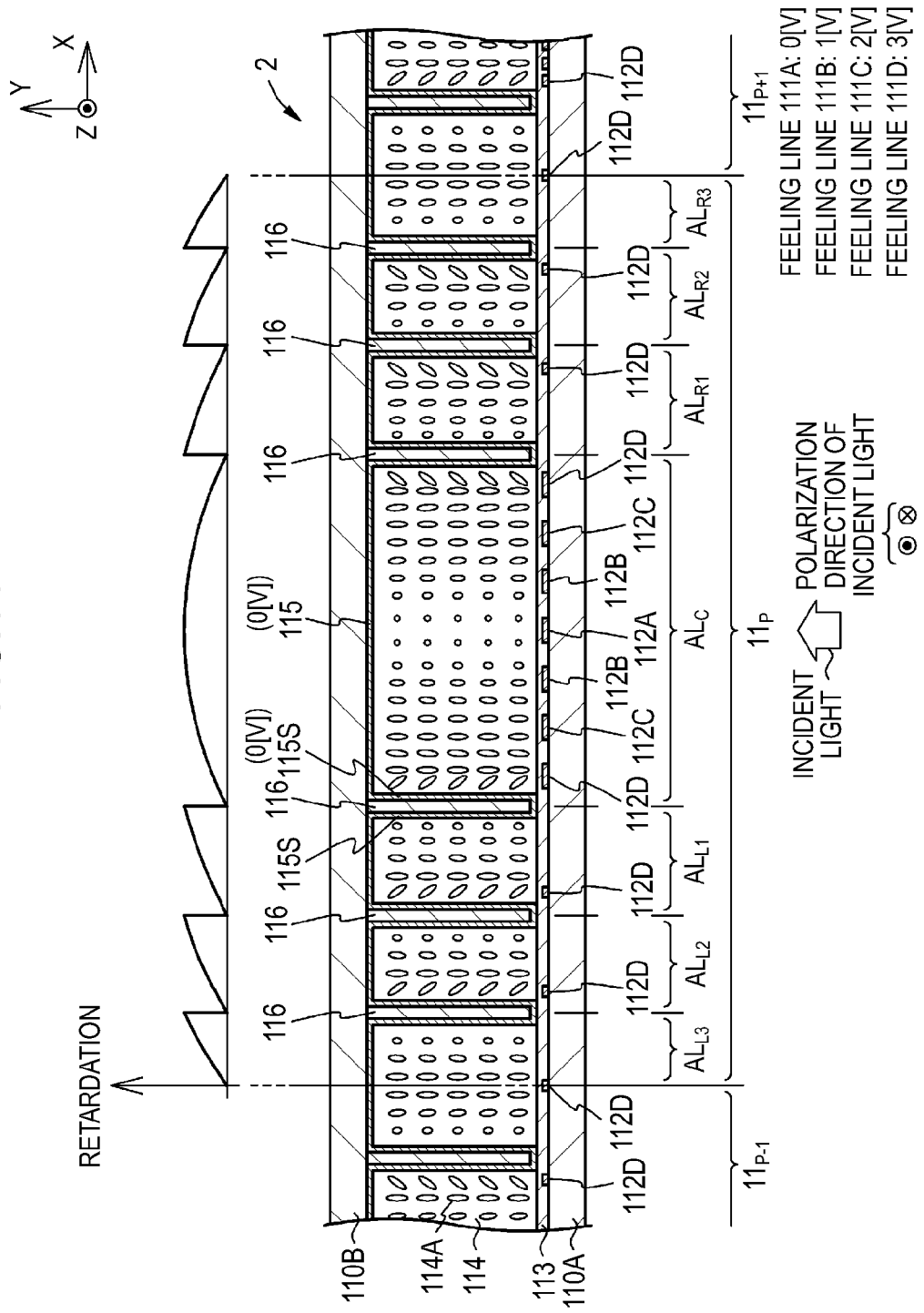
FIG. 14 is a cross-sectional view taken along B-B line of FIG. 13, which schematically shows a state in which the liquid crystal optical device forms a Fresnel lens.

FIG. 13 is a schematic plan view showing a front surface of the liquid crystal optical device according to the second embodiment. FIG. 14 is a cross-sectional view taken along B-B line of FIG. 13, which schematically shows a state in which the liquid crystal optical device forms a Fresnel lens. A schematic plan view showing a rear surface of the liquid crystal optical device is the same as the one of FIG. 4 referred to in the first embodiment.

The widths of the areas AL in the X-direction shown in FIG. 5 referred to in the first embodiment have the following relation as the liquid crystal optical device forms a Fresnel lens.

$$AL_C/2 > AL_{L1} > AL_{L2} > AL_{L3} \quad (1)$$

$$AL_C/2 > AL_{R1} > AL_{R2} > AL_{R3} \quad (2)$$

Accordingly, the width of the area AL becomes narrower as coming close to the ends of the lens line 11, where it becomes difficult to form a large number of strip electrodes 112.

Accordingly, the strip electrodes 112A, 112B and 112C are omitted at areas other than the area $AL_C$ in the second embodiment.

That is, the strip electrode 112D having a relatively high absolute value in potential difference with respect to the common electrode 115 has a dominant effect on the electric field distribution in the liquid crystal layer 114 in the area having the narrow width. The voltage of the shield electrodes 115S of the spacers 116 is 0V which is the same as the voltage of the strip electrode 112A, and the shield electrodes 115S are positioned close to the strip electrodes 112A in the vicinity of the first electrode 110A in FIG. 5. Accordingly, the shield electrodes 115S have approximately the same function as the strip electrodes 112A. According to the above reason, the retardation distribution which is approximately the same as the first embodiment can be obtained even when the strip electrodes 112A, 112B and 112C are omitted in areas other than the area $AL_C$.

The omitting manner of the strip electrodes 112 is not limited to the above. The strip electrodes 112 can be omitted appropriately according to specifications or design of the liquid crystal optical device. For example, only the electrodes represented by the sign 112D remain in respective areas other than the area ALC in the above example, however, plural number of electrodes may remain. It is also possible to omit part of electrodes only in areas $AL_{L3}$ and $AL_{R3}$ at the rightmost and leftmost positions.

Third Embodiment

A third embodiment also relates to the liquid crystal optical device to which the present disclosure is applied.

The liquid crystal optical device according to the third embodiment is a liquid crystal optical device operating as a Fresnel prism.

FIG. 15 is a schematic perspective view of a liquid crystal optical device according to the third embodiment.

In a liquid crystal optical device 3, Q-lines of prism lines 31 extending in a first direction are arranged side by side in a second direction different from the first direction. The q-th prism line 31 (q=1, 2 . . . , P) is represented by a prism line $31_q$.

As described later, respective prism lines 31 are included in a Fresnel prism configured by changing a retardation distribution of a liquid crystal layer in respective areas. A sign 310A represents the first substrate, a sign 310B represents the second substrate and a sign 317 represent a seal portion, which will be explained in detail later.

For convenience of explanation, a surface formed by a prism line group of the liquid crystal device 3 is parallel to a X-Z plane, and the prism lines 31 are arranged so as to extend in a vertical direction (Z-direction in the drawing) and to be aligned in a horizontal direction (X-direction in the drawing). A direction in which light is emitted from the liquid crystal optical device 3 is a "+Y" direction.

Figure 16:
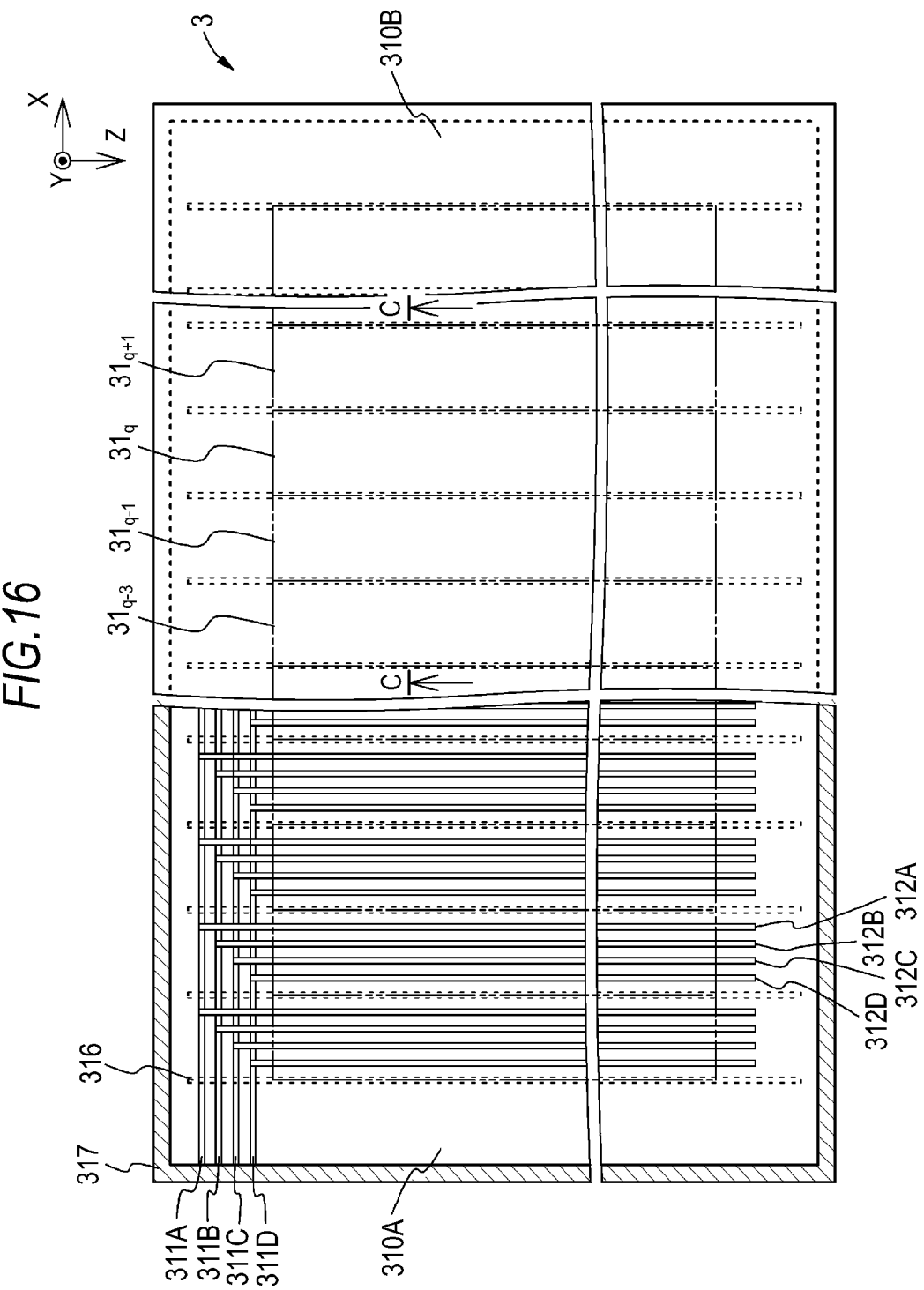
FIG. 16 is a schematic plan view showing a front surface of the liquid crystal optical device.
Figure 17:
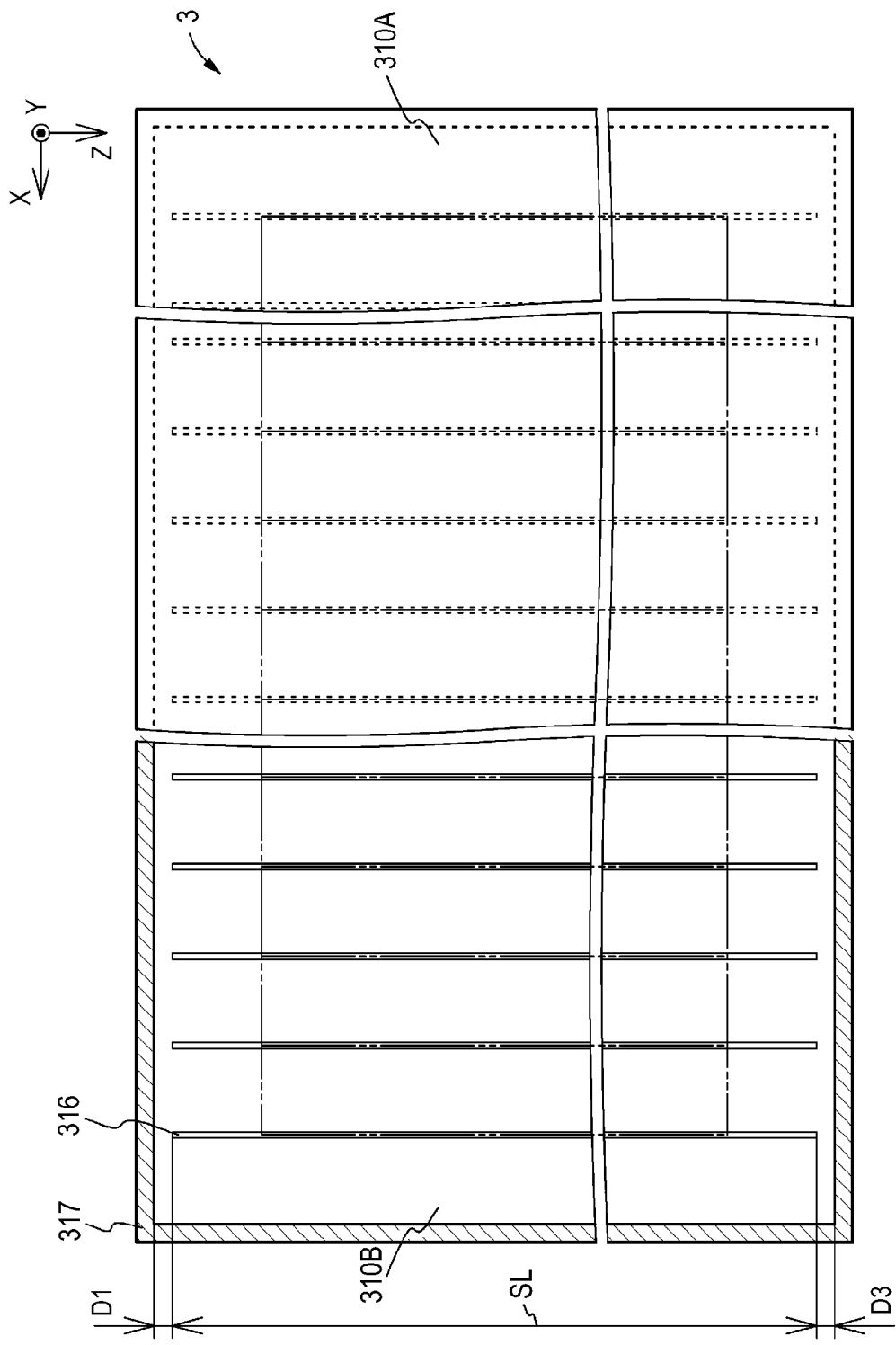
FIG. 17 is a schematic plan view showing a rear surface of the liquid crystal optical device.
Figure 18:
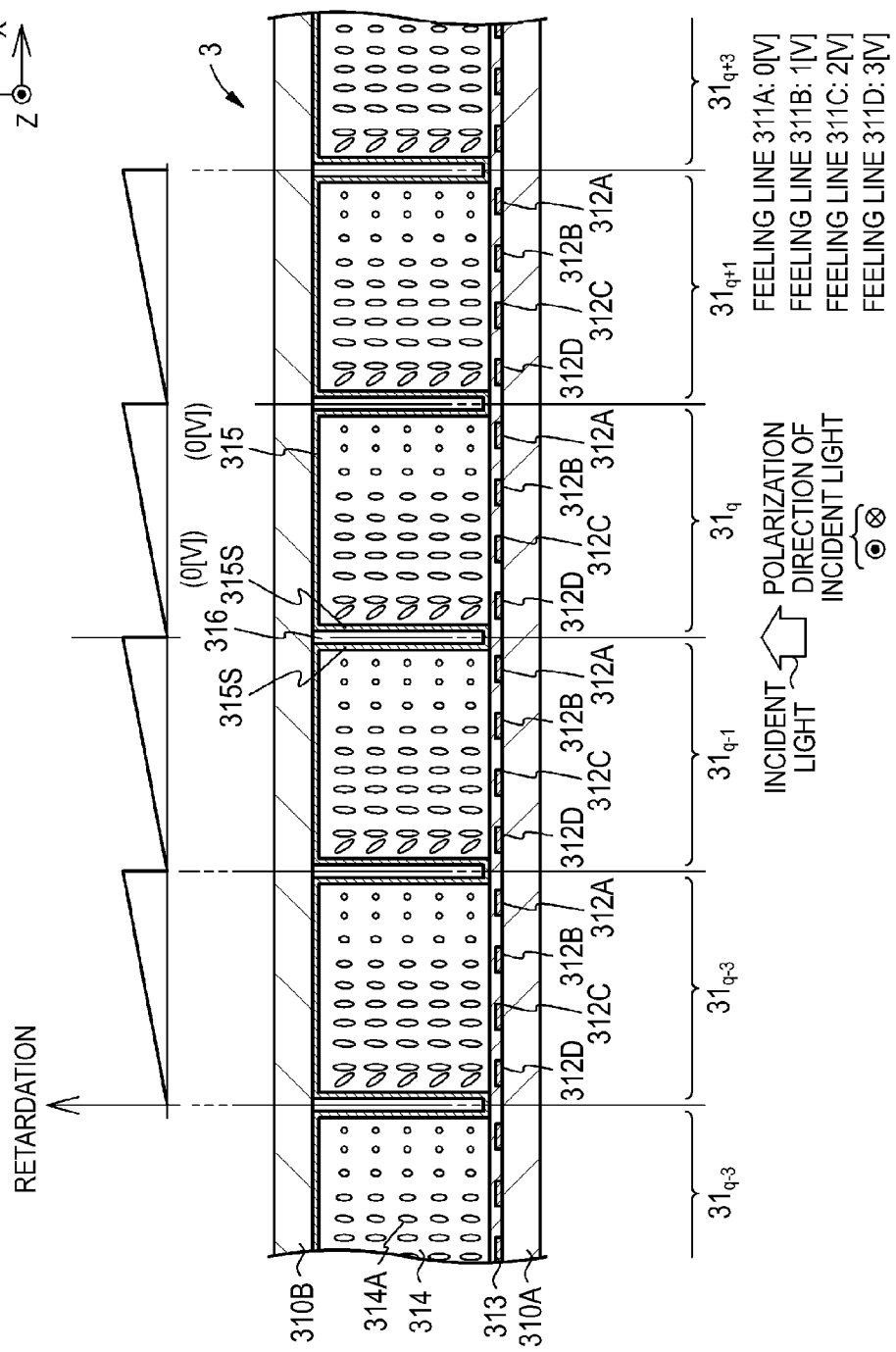
FIG. 18 is a cross-sectional view taken along C-C line of FIG. 16, which schematically shows a state in which the liquid crystal optical device forms a Fresnel prism.

FIG. 16 is a schematic plan view showing a front surface of the liquid crystal optical device. FIG. 17 is a schematic plan view showing a rear surface of the liquid crystal optical device. FIG. 18 is a cross-sectional view taken along C-C line of FIG. 16, which schematically shows a state in which the liquid crystal optical device forms a Fresnel prism.

The second substrate 310B is shown in a state in which part thereof is cut out in FIG. 16 for convenience illustration. In a portion shown in the state in which part of the second substrate 310B is cut out, the liquid crystal layer and the like are not shown. Similarly, the first substrate 310A is shown in a state in which part thereof is cutout in FIG. 17 and the liquid crystal layer and the like are not shown in a portion shown in the state in which part of the first substrate 310A is cut out.

As shown in FIG. 18 and other drawings, the liquid crystal optical device 3 includes the first substrate 310A having transparent plural strip electrodes 312 (312A, 312B, 312C and 312D) formed to make groups in respective given areas corresponding to respective prism lines 31, the second substrate 310B having a transparent common electrode 315, and a liquid crystal layer 314 arranged between the first substrate 310A and the second substrate 310B, in which a retardation distribution is controlled in respective given areas according to voltages to be applied between the common electrode 315 and the strip electrodes 312.

In the same manner as the first embodiment, the strip electrodes 312 and the common electrode 315 are formed on surfaces (inner surfaces) facing the liquid crystal layer 314 in the first substrate 310A and the second substrate 310B respectively. The liquid crystal optical device 314 is made of a positive-type nematic liquid crystal material. The thickness of the liquid crystal layer 314 is, for example, 9 [μm]. The strip electrodes 312 and the common electrode 315 are made of a transparent conductive material such as ITO, which is formed by, a well-known deposition technique. The strip electrodes 312 are formed to have a prescribed stripe shape as shown in FIG. 16 by using a well-known patterning technique.

The liquid crystal optical device 3 further includes an alignment film 313 made of, for example, polyamide. The alignment layer 313 has the same structure as the alignment layer 113 explained in the first embodiment.

Wall spacers 316 are provided at portions corresponding to boundaries of given areas corresponding to respective prism lines 31 between the first substrate 310A and the second substrate 310B. The spacers 316 have the same structure as the spacers 116 explained in the first embodiment except positions where they are formed. A shield electrode 315S to which a fixed value voltage is applied is provided on at least one of two wall surfaces (both surfaces in the example shown in FIG. 18) of each spacer 316. The spacers 316 are formed on the inner surface of the second substrate 110B, and the shield electrodes 315S are formed as electrodes integrated with the common electrode 315 in the same manner as FIG. 5 referred to in the first embodiment.

As shown in FIG. 16, feeding lines 311 (311A, 311B, 311C and 311D) extending in the horizontal direction in the stripe shape are further provided on the first substrate 310A. The feeding lines 311 have the same structure as the feeling lines 111 explained in the first embodiment.

The strip electrode 312A is connected to the feeding line 311A and the strip electrode 312B is connected to the feeding line 311B. Similarly, the strip electrode 312C is connected to the feeding line 311C and the strip electrode 312D is connected to the feeding line 311D. The contact between the feeding lines 311 and the strip electrodes 312 is not shown in FIG. 16.

As apparent from the above connection relation, respective voltages of the strip electrodes 312A, 312B, 312C and 312D are controlled by voltages to be applied to the feeding lines 311A, 311B, 311C and 311D.

The arrangement of the strip electrodes 312 in respective areas corresponding to the prism line 31 and the arrangement of the spacers 316 are explained in detail. As shown in FIG. 16, the strip electrodes 312 are formed in straight lines extending in one direction (Z-direction in the drawing). In the area corresponding to each prism line 31, the strip electrodes 312 are sequentially arranged from the left end toward the right end in the order of signs 312D, 312C, 312B and 312A, as shown in FIG. 18.

The spacers 316 are formed at portions corresponding to boundaries between areas corresponding to the prism lines 31. The spacers 316 are also formed in straight lines extending in one direction (Z-direction in the drawing) as shown in FIG. 17.

The arrangement of the strip electrodes 312 in respective areas corresponding to the prism lines 31 and the arrangement of the spacers 316 has been explained as the above. A manufacturing method of the liquid crystal optical device 3 can be replaced with the manufacturing method explained in the first embodiment with reference to FIG. 6A to FIG. 8B, therefore, explanation is omitted.

Figure 20:
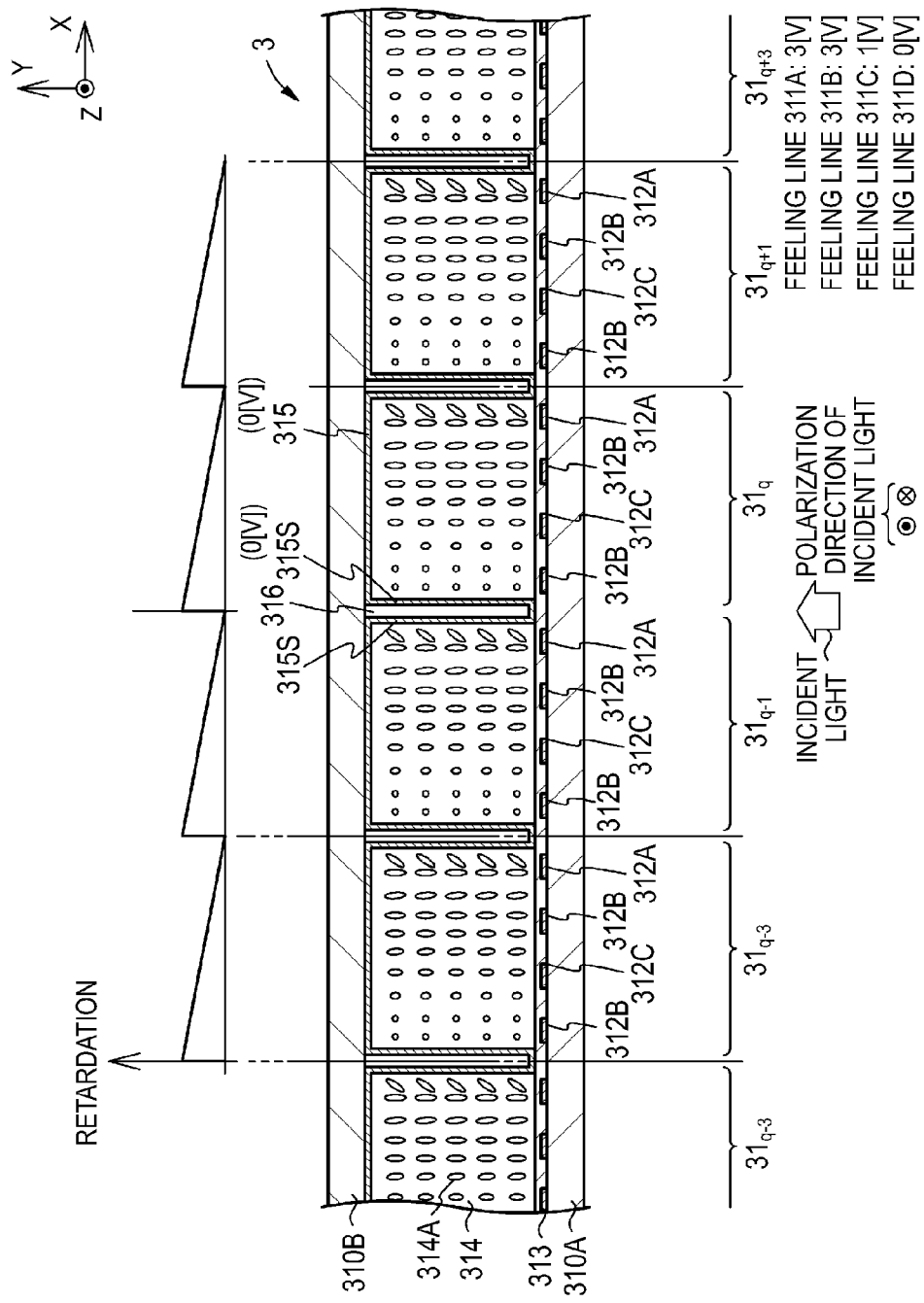
FIG. 20 is a cross-sectional view taken along C-C line of FIG. 16, which schematically shows a state in which the liquid crystal optical device forms a Fresnel prism with reverse polarity with respect to FIG. 18.

Subsequently, an operation of the liquid crystal optical device 3 will be explained with reference to FIG. 18 and FIG. 20. Assume that light in which a polarization direction is the Z-direction due to a not-shown polarizing film is incident on the liquid crystal optical device 3.

As described above, FIG. 18 is the C-C cross-sectional view of FIG. 16, which schematically shows the state in which the liquid crystal optical device 3 forms the Fresnel prism.

In the above state, a voltage of 0 (zero)V is applied to the common electrode 315 and the shield electrodes 315S. Voltages 0 (zero)V, 1V, 2V and 3V are applied to the feeding lines 311A, 311B, 311C and 311D shown in FIG. 16 respectively. Therefore, voltages of the strip electrodes 312A, 312B, 312C and 312D connected to respective feeding lines 311A, 311B, 311C and 311D will be voltages 0 (zero)V, 1V, 2V and 3V, respectively.

A voltage between the strip electrodes 312D and the common electrode 315 is 3V. Accordingly, an electric field is formed between the strip electrodes 312D and the common electrode 315 and the long axes of the liquid crystal molecules 314A are aligned in the Y-direction. A voltage between the strip electrodes 312C and the common electrode 315 is 2V. Accordingly, an electric field weaker than the above is formed between the strip electrodes 312C and the common electrode 315. The long axes of the liquid crystal molecules 314A are aligned in the Y-direction, however, the degree of alignment is weaker. Similarly, a voltage between the strip electrodes 312B and the common electrode 315 is 1V. Accordingly, an electric field is formed also between the strip electrodes 312B and the common electrode 315. The long axes of the liquid crystal molecules 314A are aligned in the Y-direction, however, the degree of alignment will be further weaker. On the other hand, a voltage between the strip electrodes 312A and the common electrode 315 is 0 (zero)V. Therefore, an electric field is not formed between the strip electrodes 312A and the common electrode 315, and the long axes of the liquid crystal molecules 314A remain in the Z-direction.

A refractive index of the liquid crystal molecules 314A in a long-axis direction is higher than a refractive index in a short-axis direction. Accordingly, in the retardation distribution (phase difference) in the liquid crystal layer 314, the retardation is high at portions corresponding to the strip electrodes 312A and is reduced toward the strip electrodes 312D.

As a result, the retardation distribution in the areas corresponding to the prism lines 31 will be a saw-tooth distribution. Optically, the liquid crystal layer 314 can be equated with the Fresnel prism having a saw-tooth cross section.

The third embodiment can be regarded as a structure in which one of the areas AL in the first embodiment (for example, the area $AL_{L2}$ shown in FIG. 5) is repeatedly formed. Accordingly, disorder in the retardation distribution can be alleviated by providing the shield electrodes in the spacers 316 in the same manner explained with reference to FIG. 10 in the first embodiment.

Figure 19:
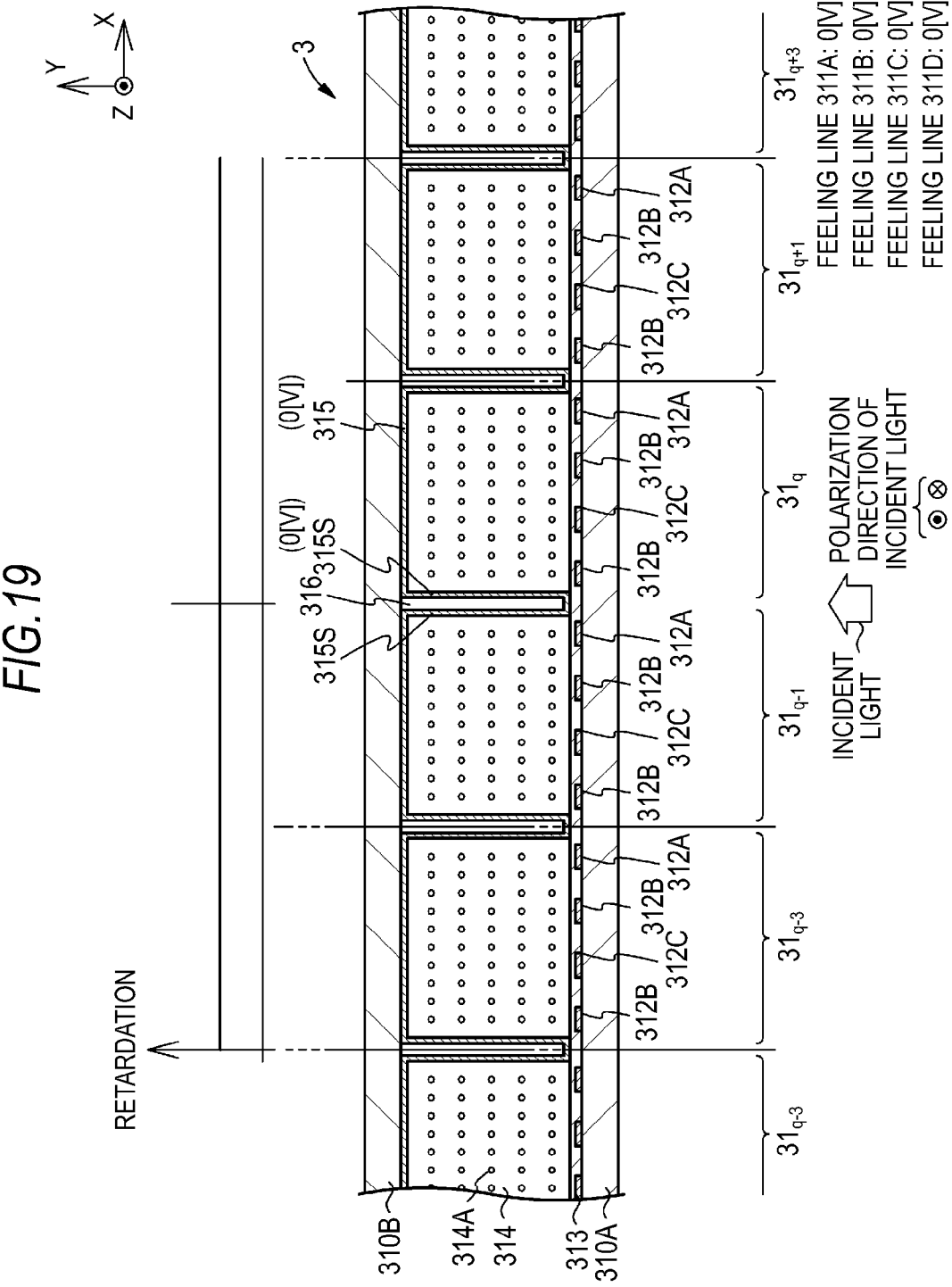
FIG. 19 is a cross-sectional view taken along C-C line of FIG. 16, which schematically shows a state in which the liquid crystal optical device does not form a Fresnel prism.

The liquid crystal optical device 3 is controlled by voltages to be applied between the common electrode 315 and the strip electrodes 312. When the common electrode 315 and the strip electrodes 312 are the same voltage, the long axes of the liquid crystal molecules 314A are aligned in the Z-direction as shown in FIG. 19. Optically, the liquid crystal layer 314 operates as a simple transparent layer. When voltages 3V, 2V, 1V and 0 (zero)V are applied to the feeding lines 311A, 311B, 311C and 311D respectively as shown in FIG. 20, the liquid crystal optical device operates as a Fresnel prism with a polarity reverse to FIG. 18.

The embodiments of the present disclosure have been specifically explained as the above, the present disclosure is not limited to the above embodiments and various modifications can be made within the scope of technical ideas of the present disclosure.

The technology according to the present disclosure may be implemented as the following configurations.

(1) A liquid crystal optical device including
a first substrate having transparent plural strip electrodes formed to make groups in respective given areas,
a second substrate having a transparent common electrode, and
a liquid crystal layer arranged between the first substrate and the second substrate, in which a retardation distribution is controlled in respective given areas according to voltages to be applied between the common electrode and the strip electrodes,
in which wall spacers are provided at portions corresponding to boundaries of given areas between the first substrate and the second substrate, and
a shield electrode to which a fixed value voltage is applied is provided on at least one of two wall surfaces of each spacer.

(2) The liquid crystal optical device described in the above (1),
in which a voltage of the same fixed value is applied to the common electrode and the shield electrodes.

(3) The liquid crystal optical device described in the above (1) or (2), in which the spacers are formed on a surface of the second substrate facing the liquid crystal layer, and the shield electrodes are formed as electrodes integrated with the common electrode.

(4) The liquid crystal optical device described in the above any one of (1) to (3), in which the liquid crystal optical device operates as a Fresnel lens controlled by voltages applied between the common electrode and the strip electrodes.

(5) The liquid crystal optical device described in the above any one of (1) to (3), in which the liquid crystal optical device operates as a Fresnel prism controlled by voltages applied between the common electrode and the strip electrodes.

(6) The liquid crystal optical device described in the above any one of (1) to (5), in which the strip electrodes are formed in straight lines extending in one direction.

(7) The liquid crystal optical device described in the above any one of (1) to (5), in which the strip electrodes are formed in an annular shape.

The present disclosure contains subject matter related to that disclosed in Japanese Priority Patent Application JP 2011-186983 filed in the Japan Patent Office on Aug. 30, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal optical device comprising:
a first substrate having transparent plural strip electrodes in respective given areas;
a second substrate having a transparent common electrode;
a liquid crystal layer between the first substrate and the second substrate in which a retardation distribution is controlled in respective given areas according to voltages to be applied between the common electrode and the plural strip electrodes;
wall spacers provided at boundaries between one area of the given areas and another area adjacent to the one area in a first direction, the first direction being orthogonal to a second direction that is parallel to a longitudinal direction of the plural strip electrodes; and
a shield electrode provided on at least one of two wall surfaces of each wall spacer,
wherein,
the liquid crystal optical device is configured to apply, during operation, a fixed value voltage to the shield electrode,
the given areas are arranged in the first direction in a symmetric manner relative to a reference area, the reference area being located at a center of a group of the given areas,
widths of the given areas vary inversely in relation to a distance from the reference area, and
the plural strip electrodes in a given area differ from the plural strip electrodes in the reference area with respect to a number of the plural strip electrodes, widths of the plural strip electrodes, a pitch between the plural strip electrodes, or any combination thereof.

2. The liquid crystal optical device according to claim 1, wherein the liquid crystal optical device is configured to apply, during operation, a voltage, having a same voltage value as the fixed value voltage, to the common electrode.

3. The liquid crystal optical device according to claim 1, wherein the wall spacers are on a surface of the second substrate facing the liquid crystal layer, and the shield electrodes are integrated with the common electrode.

4. The liquid crystal optical device according to claim 1, wherein the liquid crystal optical device operates as a Fresnel lens controlled by voltages applied between the common electrode and the plural strip electrodes.

5. The liquid crystal optical device according to claim 1, wherein the liquid crystal optical device operates as a Fresnel prism controlled by voltages applied between the common electrode and the plural strip electrodes.

6. The liquid crystal optical device according to claim 1, wherein the plural strip electrodes are configured in straight lines extending in the second direction.

7. The liquid crystal optical device according to claim 1, wherein the plural strip electrodes are formed in an annular shape.

8. The liquid crystal optical device according to claim 1, wherein the widths of the plural strip electrodes in the first direction or the pitch of the plural strip electrodes or any combination thereof decreases according to the distance from the reference area.

9. The liquid crystal optical device according to claim 1, wherein the number of the plural strip electrodes arranged in one of the given areas is less than that of the plural strip electrodes arranged in the reference area.

* * * * *